(12) United States Patent
Bunnell et al.

(10) Patent No.: US 12,427,421 B2
(45) Date of Patent: Sep. 30, 2025

(54) STORAGE MEDIUM, INFORMATION PROCESSING SYSTEM, AND GAME PROCESSING METHOD

(71) Applicant: NINTENDO CO., LTD., Kyoto (JP)

(72) Inventors: Corey Michael Bunnell, Kyoto (JP); Yuya Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 365 days.

(21) Appl. No.: 18/325,865

(22) Filed: May 30, 2023

(65) Prior Publication Data
US 2023/0390643 A1   Dec. 7, 2023

(30) Foreign Application Priority Data

Jun. 7, 2022 (JP) .................. 2022-092410

(51) Int. Cl.
*A63F 13/56* (2014.01)
*A63F 13/80* (2014.01)

(52) U.S. Cl.
CPC .............. *A63F 13/56* (2014.09); *A63F 13/80* (2014.09)

(58) Field of Classification Search
CPC ...... A63F 13/56; A63F 13/80; A63F 2300/64; A63F 13/58; A63F 13/822
USPC ......................................................... 463/31
See application file for complete search history.

(56) References Cited

U.S. PATENT DOCUMENTS

| | | | |
|---|---|---|---|
| 12,220,638 B2 * | 2/2025 | Iwao .................. | A63F 13/837 |
| 12,268,960 B2 * | 4/2025 | Suenaga ............. | A63F 13/56 |
| 2006/0246968 A1 * | 11/2006 | Dyke-Wells ........ | A63F 13/837 |
| | | | 463/2 |
| 2010/0273544 A1 * | 10/2010 | Koganezawa ...... | A63F 13/5375 |
| | | | 463/2 |
| 2022/0203233 A1 | 6/2022 | Tanaka et al. | |
| 2022/0387891 A1 * | 12/2022 | Suenaga ............. | A63F 13/58 |
| 2023/0191255 A1 * | 6/2023 | Iwao .................. | A63F 13/52 |
| | | | 463/31 |

FOREIGN PATENT DOCUMENTS

| | | |
|---|---|---|
| JP | 2005224281 A | 8/2005 |
| JP | 2005-334128 | 12/2005 |
| JP | 2010-124878 | 6/2010 |
| JP | 2010-252932 | 11/2010 |
| JP | 2016-131662 | 7/2016 |
| JP | 6928709 | 8/2021 |

* cited by examiner

*Primary Examiner* — Pierre E Elisca

(74) *Attorney, Agent, or Firm* — Nixon & Vanderhye PC

(57) ABSTRACT

An example of an information processing system controls motions of a plurality of non-player characters in a virtual space. The information processing system, based on a predetermined condition, sets each of the plurality of non-player characters in a fightable state for fighting against another non-player character or a player character operated according to an operation input performed by a user. A fighting group in which a plurality of characters including a non-player character in the fightable state participate, is set. For the non-player character participating in the fighting group, another character participating in the fighting group is set as a fight target. Based on the fight target set for the non-player character, a motion, regarding a fight, of the non-player character is controlled.

21 Claims, 20 Drawing Sheets

Fig.10

| | | |
|---|---|---|
| PLAYER CATEGORY | PARTICIPATION CONDITION | NONE |
| | GENERATION CONDITION | OWN GROUP IS NOT GENERATED |
| | DISSOLUTION CONDITION | NONE |
| | DIVISION CONDITION | NONE |
| | INTEGRATION CONDITION | NONE |
| COMPANION CATEGORY | PARTICIPATION CONDITION | TARGET IS SETTABLE, AND CHARACTER IS IN GROUP AREA |
| | GENERATION CONDITION | NONE |
| | DISSOLUTION CONDITION | CHARACTER IS NOT A TARGET IN OWN GROUP |
| | DIVISION CONDITION | CHARACTER IS OUTSIDE GROUP AREA, AND CHARACTER ITSELF IS A TARGET |
| | INTEGRATION CONDITION | CHARACTER IS REPRESENTATIVE OF GROUP, AND IS IN ANOTHER GROUP HIGHER IN PRIORITY |
| ENEMY CATEGORY | PARTICIPATION CONDITION | TARGET IS SETTABLE, AND CHARACTER RECOGNIZES REPRESENTATIVE |
| | GENERATION CONDITION | OWN GROUP IS NOT GENERATED |
| | DISSOLUTION CONDITION | NONE |
| | DIVISION CONDITION | NONE |
| | INTEGRATION CONDITION | CHARACTER IS REPRESENTATIVE OF GROUP, AND RECOGNIZES REPRESENTATIVE OF ANOTHER GROUP HIGHER IN PRIORITY |

# STORAGE MEDIUM, INFORMATION PROCESSING SYSTEM, AND GAME PROCESSING METHOD

CROSS REFERENCE TO RELATED APPLICATION

This application claims priority to Japanese Patent Application No. 2022-92410, filed on Jun. 7, 2022, the entire contents of which are incorporated herein by reference.

FIELD

The present disclosure relates to a storage medium, an information processing system, and a game processing method for executing a game in which a plurality of characters fight.

BACKGROUND AND SUMMARY

Conventionally, when a plurality of characters that appear in a game are caused to fight against each other, a character to be attacked (attack target) is determined based on a positional relationship with the attack target, whether or not the attack target is damaged, and the like.

Conventionally, since the process of determining an attack target of a character is performed for each character, when a plurality of characters fight against each other, there is the possibility that an unintended fighting situation as a whole occurs, for example, attack targets are concentrated on one character.

Therefore, the present application discloses a storage medium, an information processing system, and a game processing method for managing a fight.

(1)

An example of a non-transitory computer-readable storage medium described herein stores a game program for causing a processor of an information processing apparatus to execute a game. The game program causes the processor to execute: controlling motions of a plurality of non-player characters in a virtual space; based on a predetermined condition, setting each of the plurality of non-player characters in a fightable state for fighting against another non-player character or a player character operated according to an operation input performed by a user; setting a fighting group in which a plurality of characters including a non-player character in the fightable state participate; setting, for the non-player character participating in the fighting group, a fight target that is another character participating in the fighting group; and controlling a motion, regarding a fight, of the non-player character based on the fight target set for the non-player character.

According to the configuration of the above (1), the fighting group in which the plurality of characters participate is set, and the fight targets for the non-player characters are set in the fighting group. This reduces the possibility that the non-player characters take unintended behaviors (e.g., the attack targets of a plurality of non-player characters concentrate on a particular character), thereby realizing an intended fight as a whole.

(2)

In the configuration of the above (1), the fighting group in which the non-player character in the fightable state participates may be determined, for each non-player character, based on a group setting condition set for the non-player character.

According to the configuration of the above (2), the behaviors of the non-player characters during the fight can be determined for each non-player character, and each non-player character is caused to take a behavior according to the feature of the non-player character, thereby realizing an intended fight as a whole.

(3)

In the configuration of the above (2), each of the plurality of non-player characters may be assigned to any of a plurality of categories. The group setting condition may be set for each of the categories. The fighting group in which the non-player character in the fightable state participates may be determined based on the group setting condition that is set for the category to which the non-player character is assigned.

According to the configuration of the above (3), each non-player character is caused to take a behavior according to the feature, for each category, of the non-player character, thereby realizing an intended fight as a whole. In addition, the amount of data of the group setting condition can be reduced, and development costs for the group setting condition can be reduced.

(4)

In the configuration of the any one of above (1) to (3), a character to be a representative of the fighting group may be set from among the non-player character and the player character that are in the fightable states. The fighting group may be set for each character to be the representative. Among the non-player character and the player character that are in the fightable states, a character that satisfies a participation condition as to the fighting group in which the representative is set, may be added to the fighting group.

According to the configuration of the above (4), since the character to be a representative is set for each fighting group, management of the fighting groups is facilitated.

(5)

In the configuration of the above (4), dissolution of the fighting group or integration of the fighting group with another fighting group may be performed based on the group setting condition that is set for the character to be the representative of the fighting group.

According to the configuration of the above (5), dissolution and/or integration of the fighting group can be easily determined based on the character to be a representative.

(6)

In the configuration of the above (4) or (5), the character to be the representative and the character that participates in the fighting group may be set so that the player character does not participate in the fighting group as a character not being the representative.

According to the configuration of the above (6), a situation in which the player character fights against a non-player character can be easily generated.

(7)

In the configuration of the any one of above (4) to (6), on a condition that a positional relationship between a character that participates in a first fighting group and is not a representative of the first fighting group and a character to be a representative of the first fighting group has become a positional relationship more distant than a predetermined criterion, a second fighting group in which the character that is not a representative of the first fighting group is a representative, may be newly generated.

According to the configuration of the above (7), even when the distance between the non-player characters is increased, a more natural fight intended as a whole can be realized.

(8)

In the configuration of the above (7), another character whose fight target in the first fighting group has been the character to be the representative of the second fighting group, may be added to the second fighting group.

According to the configuration of the above (8), also when a new fighting group is generated, a more natural fight intended as a whole can be realized.

(9)

In the configuration of the any one of above (4) to (8), on a condition that the character to be the representative of the fighting group is not set as a fight target for any of other characters, the fighting group may be dissolved. A fighting group in which the character to be the representative of the dissolved fighting group participates, may be determined based on the group setting condition.

According to the configuration of the above (9), an intended fight as a whole can be realized even after the fighting group is dissolved.

(10)

In the configuration of the any one of above (4) to (9), on a condition that a positional relationship between a character to be a representative of a certain fighting group and a character to be a representative of another fighting group has become a positional relationship closer than a predetermined criterion, the certain fighting group and the another fighting group may be integrated into one fighting group.

According to the configuration of the above (10), when the characters participating in different fighting groups are located near to each other, a more natural fight intended as a whole can be realized.

(11)

In the configuration of the any one of above (1) to (10), when there is a change in the characters participating in the fighting group, the fight target may be reset for each of the non-player characters participating in the fighting group.

If there is a change in the characters participating in the fighting group, the fighting state that is intended as a whole and is considered to be natural may also be changed. However, according to the configuration of the above (11), the fight targets for the non-player characters can be appropriately set, thereby realizing an intended fight as a whole.

(12)

In the configuration of the above (11), when there is no change in the characters participating in the fighting group, the fight target may be maintained for each of the non-player characters participating in the fighting group.

According to the configuration of the above (12), an intended fight as a whole can be realized in the situation where there is no change in the characters participating in the fighting group.

(13)

In the configuration of the any one of above (1) to (12), each of the characters participating in the fighting group may be set to either a first type or a second type. A fight target for a non-player character of the first type may be set from among characters of the second type, and a fight target for a non-player character of the second type may be set from among characters of the first type.

According to the configuration of the above (13), setting of fight targets in the case where two hostile powers fight against each other is facilitated.

(14)

In the configuration of the above (13), each of the plurality of non-player characters and the player character may be assigned to any of a plurality of categories. The plurality of categories may include a first category, a second category hostile to characters belonging to the first category, and a third category different from the first category and the second category. In a case where a character of the first category and a character of the third category participate in the fighting group and a character in the second category does not participate in the fighting group, the character of the first category may be set to the first type, and the character of the third category may be set to the second type. In a case where a character of the first category, a character of the second category, and a character of the third category participate in the fighting group, the character of the first category and the character of the third category may be set to the first type, and the character of the second category may be set to the second type.

According to the configuration of the above (14), it is possible to easily realize a behavior of a non-player character according to the situation, such as fighting against a character in the first category or fighting in cooperation with a character in the first category, thereby easily realizing an intended fight.

(15)

In the configuration of the above (13) or (14), a character of the first type may be provided with at least information indicating a capacity in a case where the character becomes a fight target for a character of the second type. A character of the second type may be provided with at least information indicating a weight of the character in a case where a character of the first type is set as a fight target for the character of the second type. In the fighting group, a fight target for the character of the second type may be set so that a magnitude based on weights set for one or more characters of the second type, for which one character of the first type is set as a fight target, does not exceed a capacity set for the character of the first type being the fight target.

According to the configuration of the above (15), since the capacity is set for each character, the possibility that fight targets are concentrated on one character and thereby the fight becomes unnatural and unintended as a whole, can be reduced. In addition, since the weight is set for each character, setting of a fight target can be performed while reflecting the feature of each character.

(16)

In the configuration of the any one of above (13) to (15), the player character and a non-player character being a companion of the player character may be set to the first type.

According to the configuration of the above (16), the player character and a non-player character as a companion of the player character do not become each other's fight targets. Therefore, behaviors of these characters cooperating with each other can be easily realized, thereby easily realizing an intended fight.

(17)

In the configuration of the any one of above (13) to (16), in the fighting group, a character of the first type that is not a fight target may be set as a fight target for a character of the second type, preferentially over a character of the first type that is a fight target.

According to the configuration of the above (17), the fight targets for the plurality of characters can be set in a balanced manner, thereby easily realizing a natural fight intended as a whole.

(18)

In the configuration of the any one of above (13) to (17), a character of the first type may be provided with at least information indicating a capacity in a case where the character becomes a fight target for a character of the second type. A character of the second type may be provided with at least information indicating a weight of the character in a case where a character of the first type is set as a fight target for the character of the second type. In the fighting group, a fight target for the character of the second type may be set so that a magnitude based on weights set for one of more characters of the second type, for which one character of the first type is set as a fight target, does not exceed a capacity set for the character of the first type being the fight target. The player character may be set to the first type. A capacity set for the player character may be greater than a capacity set for a non-player character of the first type.

According to the configuration of the above (18), chances for the player to perform game operations for the fight can be increased, thereby enhancing amusement of the game.

(19)

In the configuration of the any one of above (1) to (18), a target on which a non-player character performs an attack motion may be determined based on a fight target set for the non-player character and a rule set for the non-player character.

According to the configuration of the above (19), the attack target of the non-player character can be changed according to the situation, thereby making the behavior of the non-player character more natural.

The present specification discloses examples of an information processing apparatus and an information processing system that execute the processes in the above (1) to (19). Furthermore, the present specification discloses an example of an information processing method that executes the processes in the above (1) to (19).

According to the storage medium, the information processing system, or the game processing method described above, an intended fight as a whole can be realized.

These and other objects, features, aspects and advantages of the exemplary embodiment will become more apparent from the following detailed description when taken in conjunction with the accompanying drawings.

BRIEF DESCRIPTION OF THE DRAWINGS

FIG. 10 shows an example of group setting conditions;

DETAILED DESCRIPTION OF NON-LIMITING EXAMPLE EMBODIMENTS

1. Configuration of Game System

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
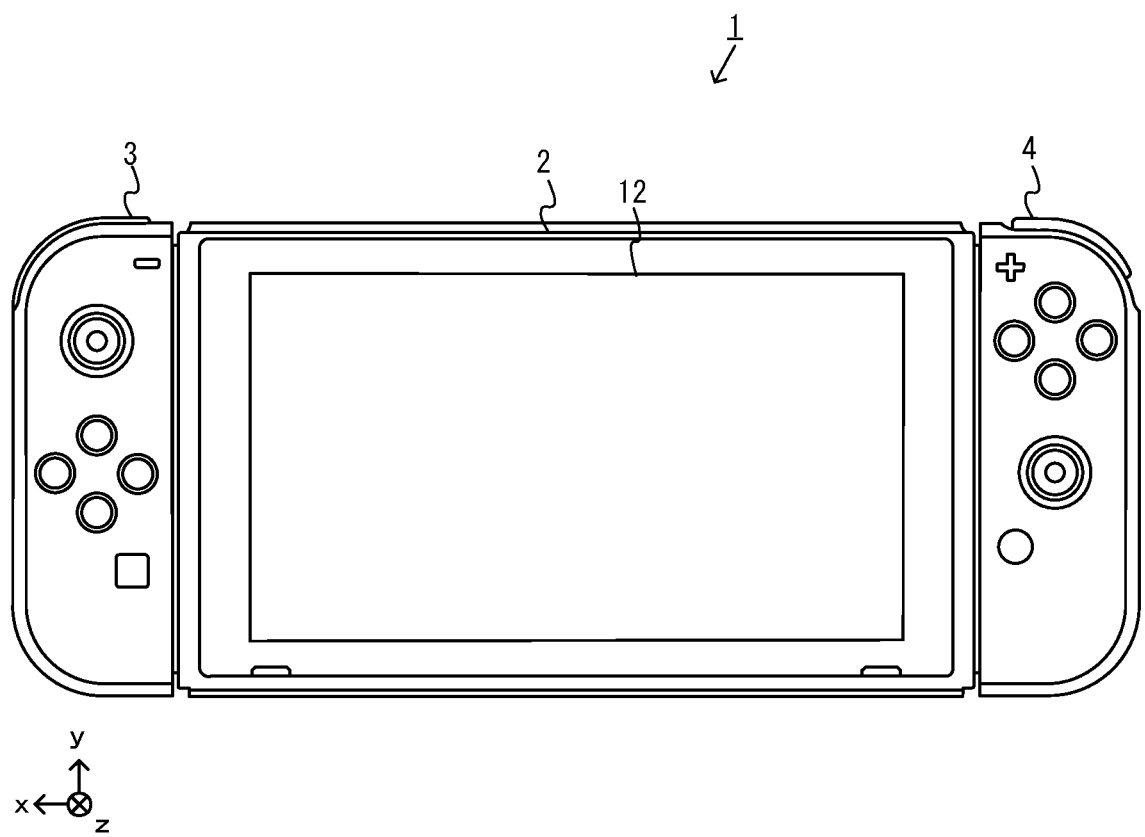
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
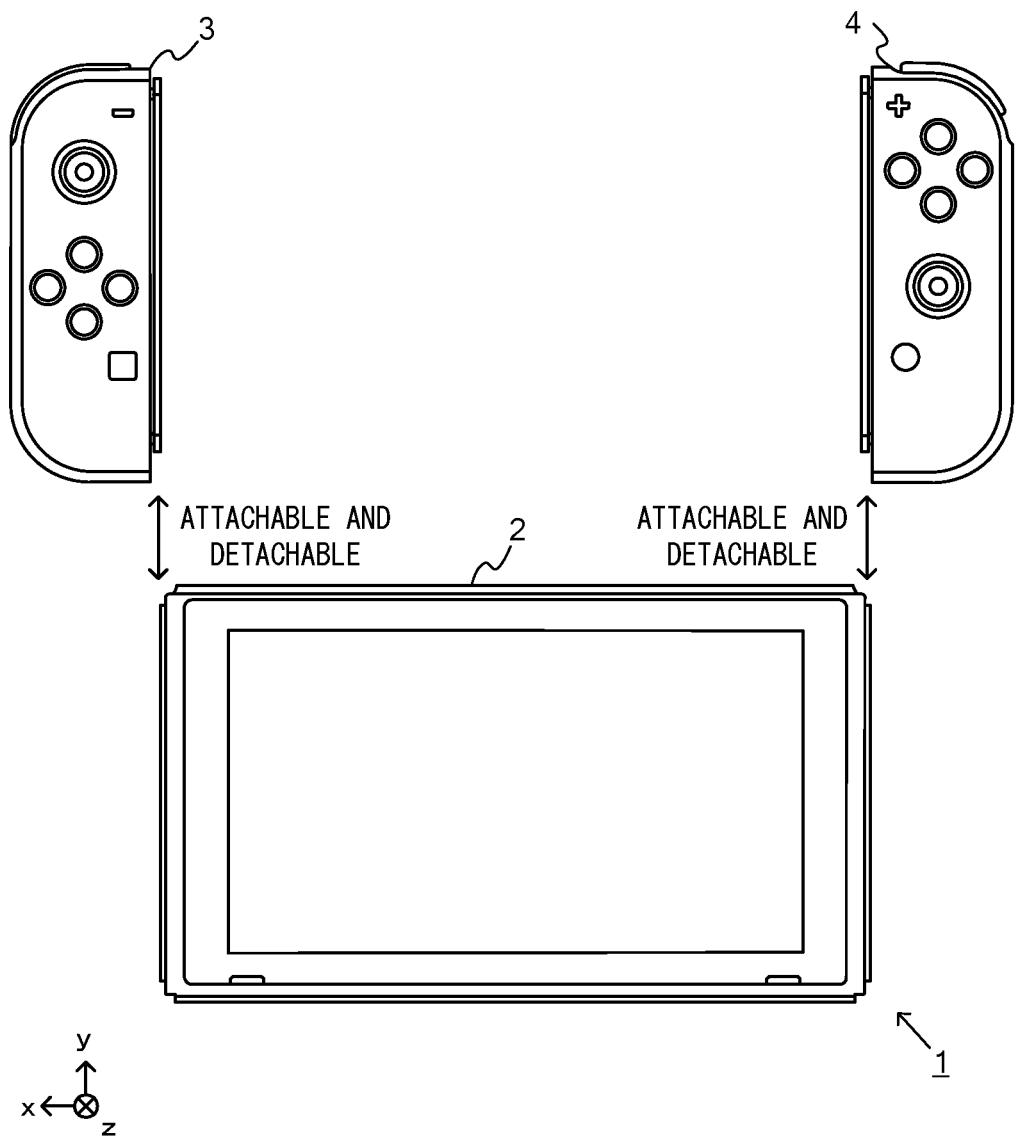
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a "controller".

Figure 3:
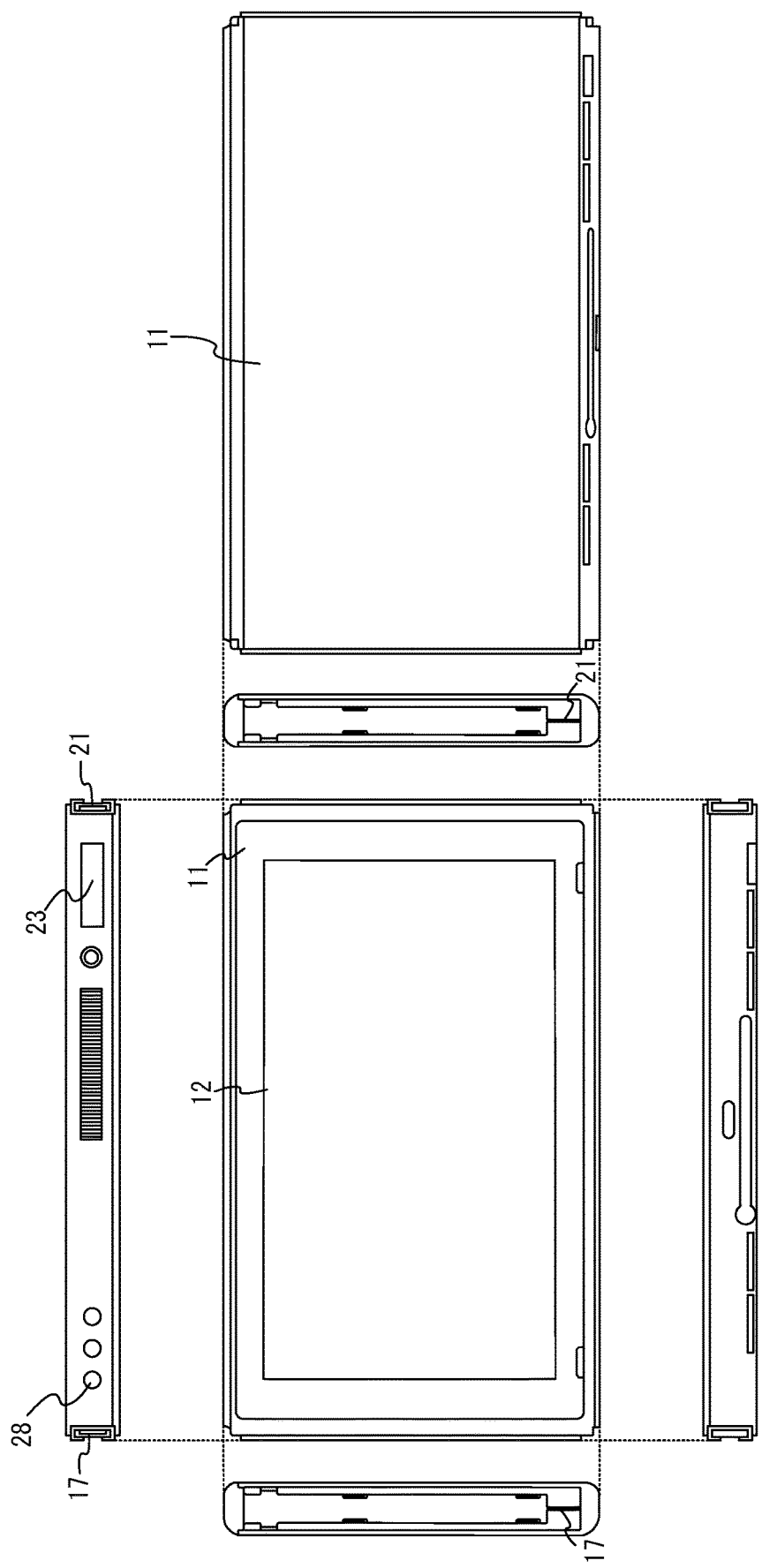
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
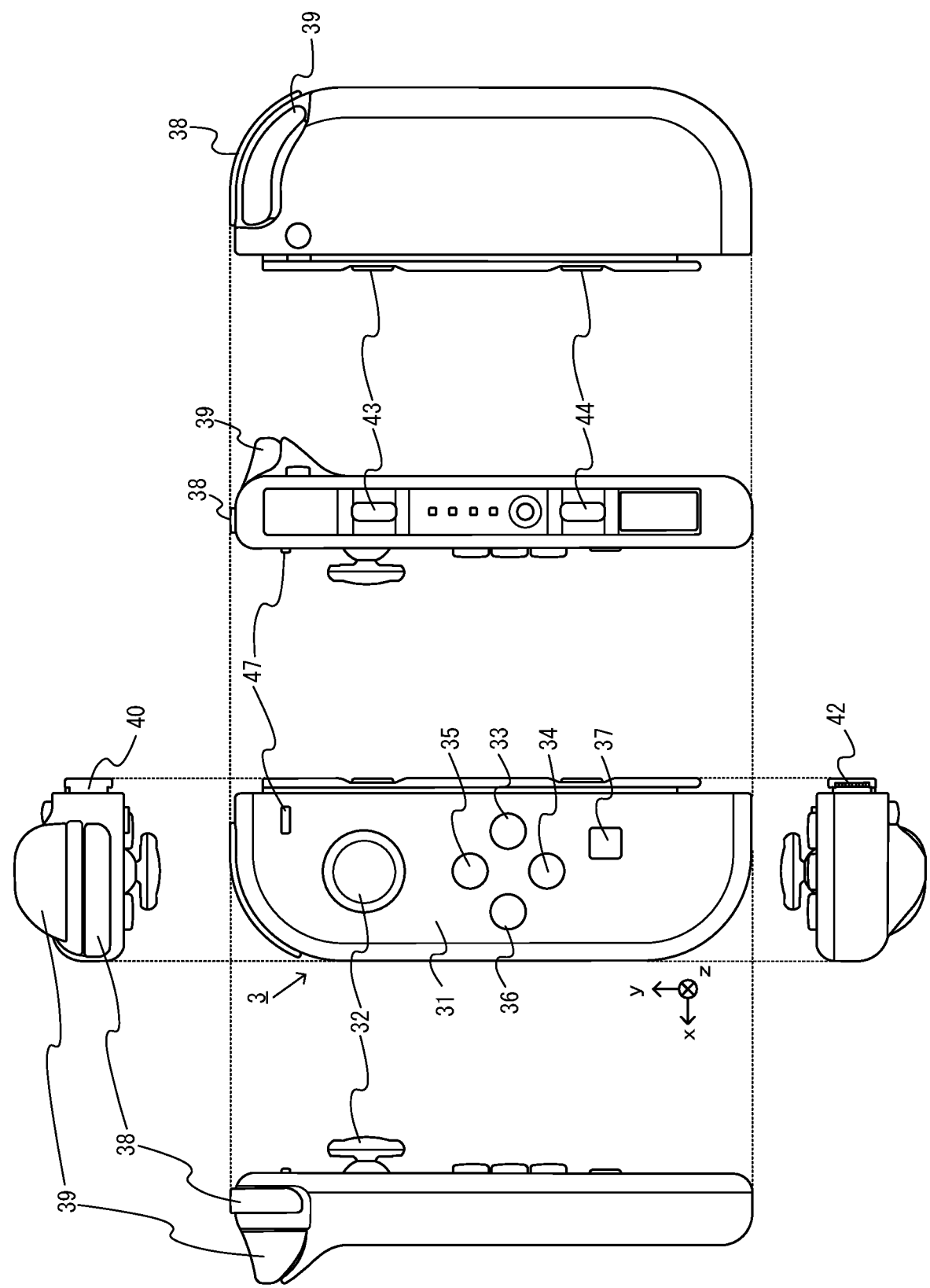
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a "−" (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
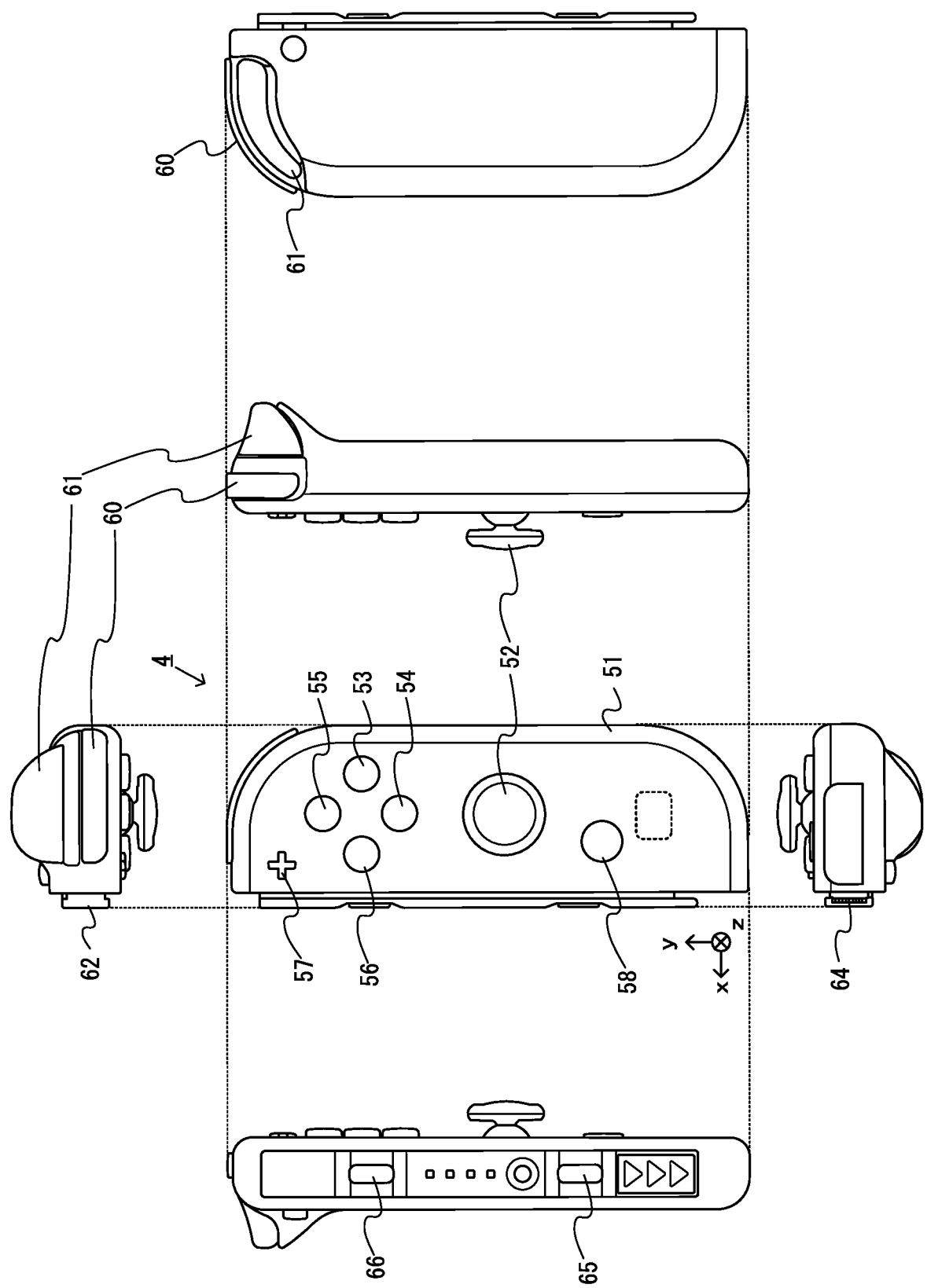
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
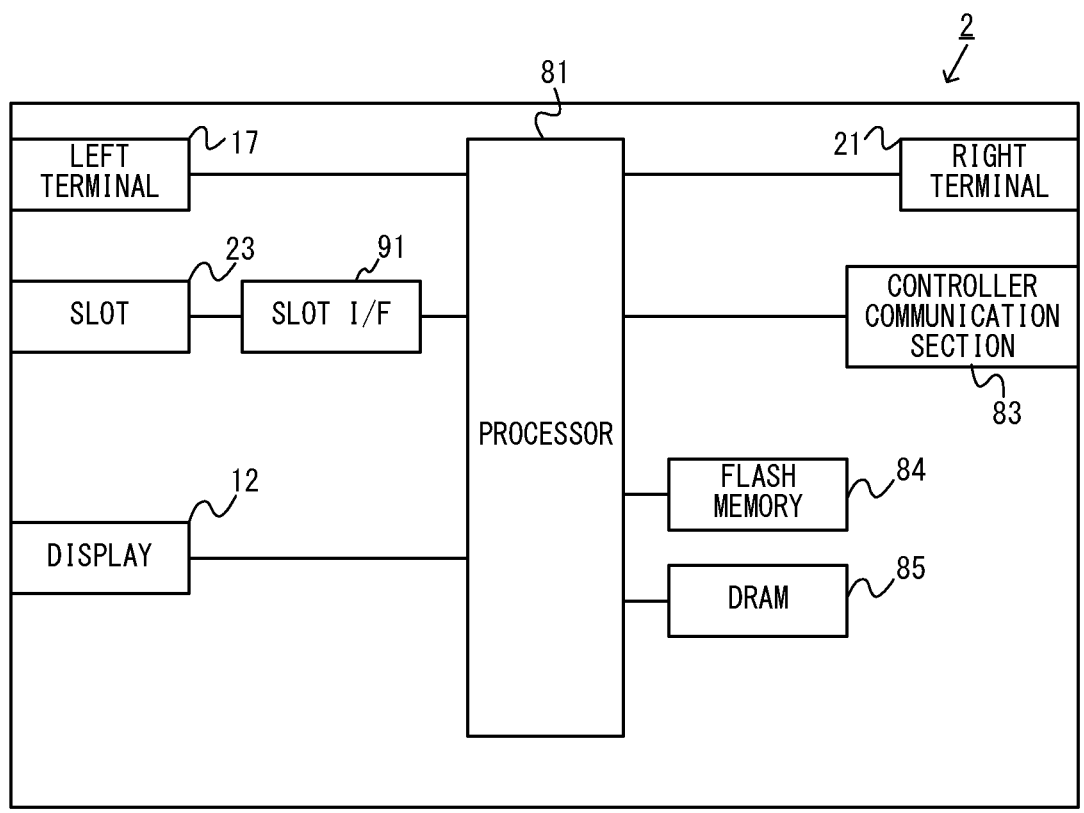
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81, 83 to 85, and 91 shown in FIG. 6 in addition to the components shown in FIG. 3. Some of the components 81, 83 to 85, and 91 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, and the right terminal 21. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 7:
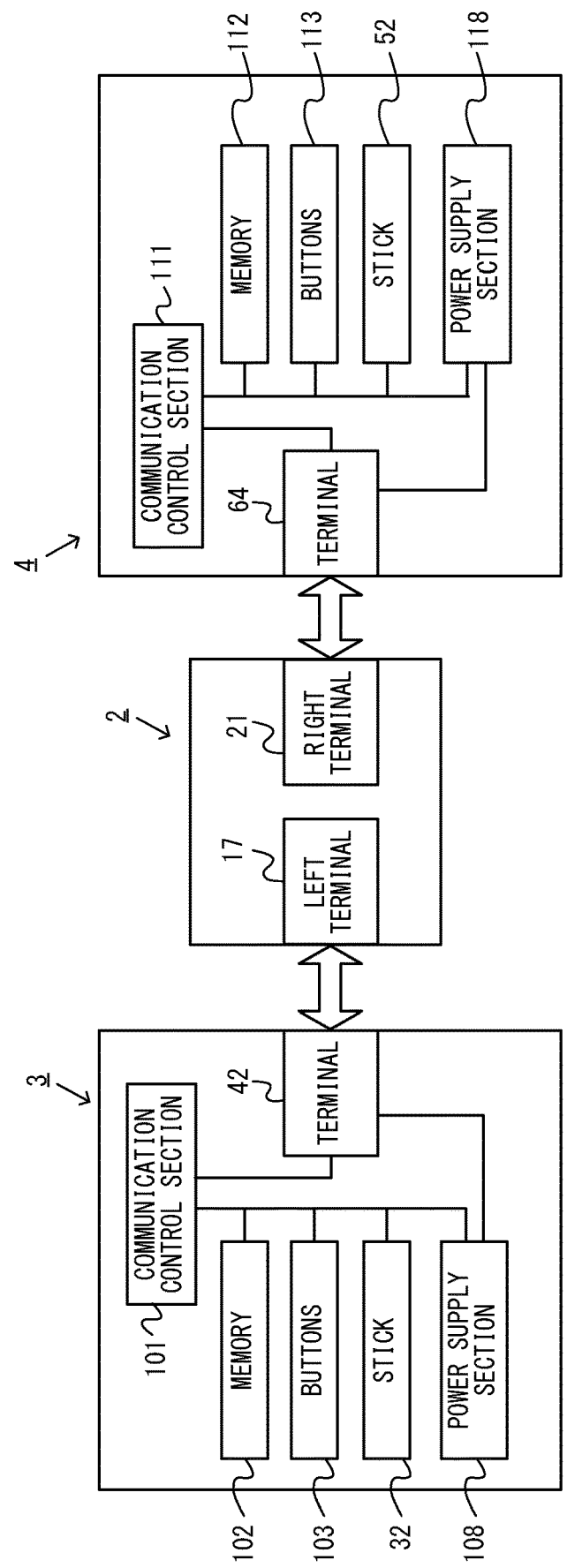
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

2. Outline of Processing in Game System

Hereinafter, an outline of information processing executed in the game system 1 will be described. In the exemplary embodiment, the game system 1 executes a game in which a plurality of characters including a player character operated by a player (or a user) appear in a virtual game space, and fight against each other. In the exemplary embodiment, the game system 1 sets, for each character, a character to be a fight target from among the other characters hostile to the character. The "fight target" serves as a reference for determining a target to be attacked by the character (i.e., another character to be an attack target). In the exemplary embodiment, the game system 1 appropriately sets the fight target for each character, thereby making the behavior of the character natural during the fight.

2-1. Categories of Characters

First, categories regarding the characters that fight against each other will be described. In the exemplary embodiment, a plurality of categories regarding the characters are prepared, and each character is assigned to one of the categories. For each category to which the character is assigned, a category of a character that can be hostile to the character in this category is determined. Specifically, in the exemplary embodiment, a character that can fight is assigned to any one of four categories including a player category, a companion category, an enemy category, and a third force category.

The player category is a category to which the player character operated by the player is assigned. In the exemplary embodiment, one player character appears in the game. However, in other embodiments, there may be a plurality of player characters assigned to the player category.

The companion category is a category to which a companion character that is a character on the side of the player character is assigned. When the characters fight against each other, the companion character attacks a character (specifically, an enemy character described later, etc.) hostile to the player character.

The enemy category is a category to which an enemy character that is a character hostile to the player character is assigned. When the characters fight against each other, the enemy character attacks the player character and a character (e.g., a companion character) on the side of the player character.

The third force category is a category to which a third force character is assigned. The third force character is a character that becomes a companion or an enemy of the player character according to the situation. Although described in detail later, when the characters fight against each other, the third force character may attack the player character and the companion character, or may attack the enemy character, according to the game situation.

The companion character, the enemy character, and the third force character are non-player characters (hereinafter abbreviated as "NPC"). The NPC is a character which is different from the player character operated by the player, and whose motion is automatically controlled by the game system 1. That is, the attack targets and the attack motions of the companion character, the enemy character, and the third force character are determined by the game system 1. However, a part of motions of the NPCs may be performed as a result of an operation performed by the player. For example, in the exemplary embodiment, through an operation to the player character, the player can cause the player character to perform a motion of making an instruction to the companion character, and the companion character may perform a specific motion according to the instruction of the player character. The specific content of the specific motion is optional. The specific motion may be a motion of attacking another character, or may be a motion of recovering the player character or improving the ability of the player character.

The kinds and the number of categories to which the characters are assigned are/is optional. In other embodiments, other categories different from the above four categories may be set. For example, in other embodiments, a category to which a character that is hostile to the enemy character but is not hostile to the characters in the other categories is assigned, may be set. Thus, a character in a certain category may not be hostile to a character in another specific category. In other embodiments, a category to which a specific enemy character (e.g., a boss character) is assigned and a category to which the other enemy characters are assigned may be respectively set. In this case, group setting conditions described later may be set to be different between the respective categories. Moreover, when there are a plurality of tribes of enemy characters, a category may be set for each tribe, or a category may be set for some tribes.

In other embodiments, the categories to which the characters are assigned may be changed during the game. For example, in other embodiments, in a game in which the player can operate a plurality of characters while switching the characters, a character, among the plurality of characters, being operated by the player may be the player character while the other character may be a companion character (in this case, the other character is an NPC). Then, if the character being operated by the player among the plurality of characters is switched from a first character to a second character, the first character may be changed from the player character to the companion character (i.e., from the player category to the companion category), and the second character may be changed from the companion character to the player character.

2-2. Outline of Fight Target Setting Process

Figure 8:
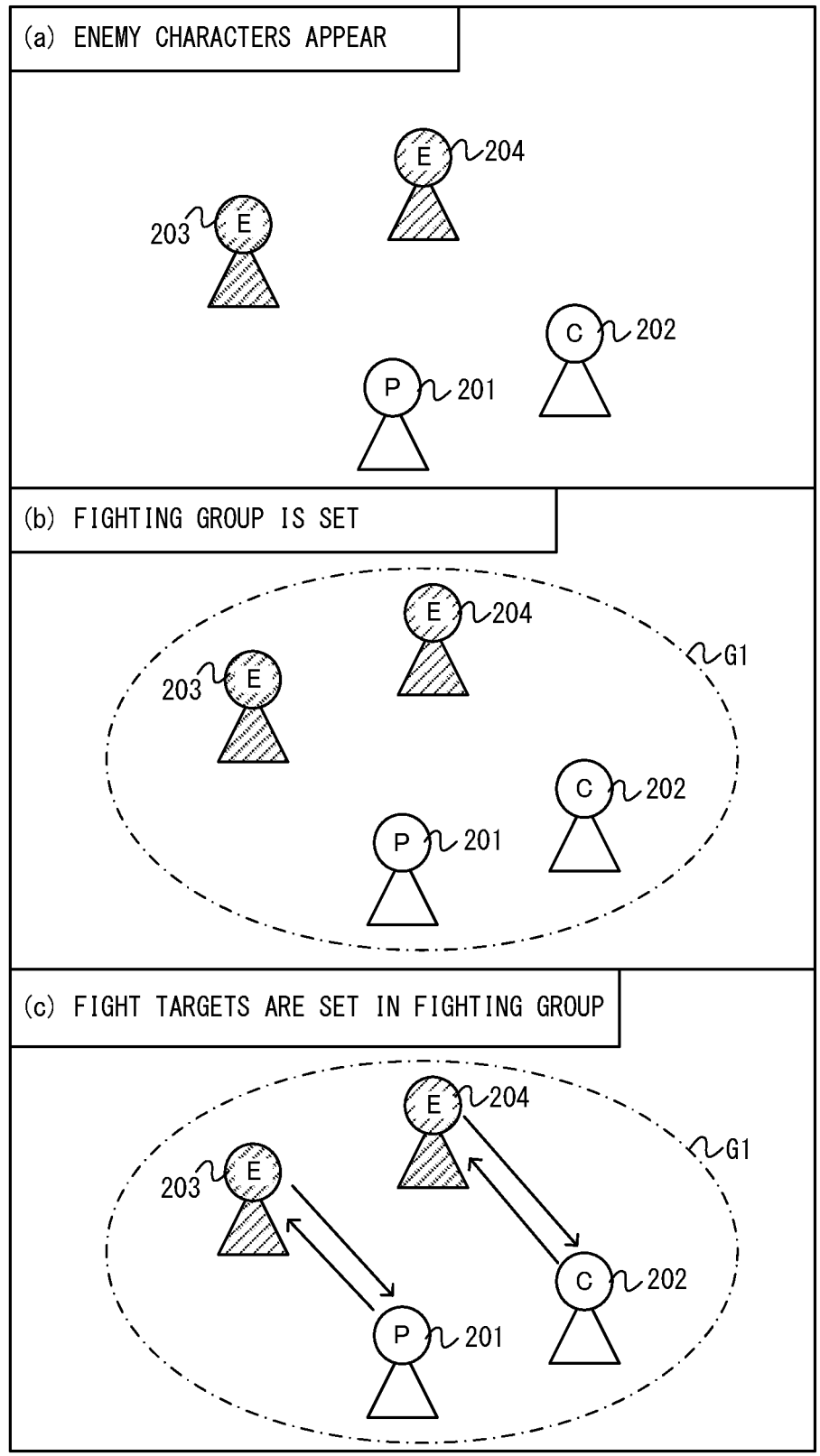
FIG. 8 shows an example of a process flow when fight targets are set.

Next, an outline of a fight target setting process will be described. FIG. 8 shows an example of a process flow when a fight target is set. In FIG. 8, a player character 201, a companion character 202, and enemy characters 203 and 204 are placed in the game space. In the situation shown in (a) of FIG. 8, the enemy characters 203 and 204 appear near the player character 201, and the enemy characters 203 and 204 have found the player character 201.

In the exemplary embodiment, in the situation in which the characters are placed in the game space as shown in (a) of FIG. 8, the game system 1 generates a fighting group under a certain condition. The fighting group is a group in which the characters fight against each other. The fighting group is a group used for setting a fight target for each character. For example, in the example shown in (b) of FIG. 8, a fighting group G1 in which the four characters 201 to 204 participate is generated. Although described in detail later, in the exemplary embodiment, a plurality of fighting groups may be set depending on the game situation.

Although described in detail later, in the exemplary embodiment, the game system 1 newly generates a fighting group, dissolves a fighting group (or causes the fighting group to disappear), divides a fighting group, and integrates a fighting group with another fighting group. In the exemplary embodiment, the game system 1 determines, for each character, various conditions for performing generation, etc., of a fighting group, thereby managing the fighting group (specifically, managing participation of an NPC in the fighting group, and generation, dissolution, division, and integration of the fighting group).

Next, based on the fighting group, the game system 1 sets a fight target for each character that participates in the fighting group. The fight target for the character is selected from among the other characters included in the fighting group in which the character participates. In addition, based on the categories described above, the fight target for the character is selected from among the characters in the category hostile to the character. For example, in the example shown in (c) of FIG. 8, the fight target for the player character 201 is set to the enemy character 203, the fight target for the enemy character 203 is set to the player character 201, the fight target for the companion character 202 is set to the enemy character 204, and the fight target for the enemy character 204 is set to the companion character 202 (see arrows shown in FIG. 8). When a plurality of fighting groups are set, the game system 1 sets, for each fighting group, a fight target for each character that participates in the fighting group.

In the exemplary embodiment, based on the fight targets set as described above, the game system 1 controls the motions of the NPCs (i.e., the companion character, the enemy character, and the third force character) during the fight. That is, the game system 1 determines an attack target of a character, based on the fight target for the character, and controls the character to perform an attack motion to the determined attack target. An NPC may not necessarily attack another character that is set as a fight target for the NPC. Although described in detail later, a character may attack another character that is set as a fight target for the character, or may attack a character different from the another character set as the fight target according to the situation.

Since the attack target of the player character is determined by an operation performed by the player, it can be said that the attack target of the player character is determined by the player. However, as described above, in the exemplary embodiment, a fight target is also set for the player character in addition to setting a fight target for each NPC. The reason for this will be described later.

As described above, in the exemplary embodiment, the game system 1 manages the fighting group, and sets a fight target for each character that participates in the fight, by using the fighting group. Thus, the game system 1 can control the behaviors of the respective characters during the fight to realize a natural fight intended as a whole.

As for the method of determining an attack target of each NPC, a method of determining an attack target of each NPC according to an algorithm for determining a motion of the NPC without managing a fighting group, is also conceivable. However, in this method, a game developer sets an algorithm for determining an attack target while comprehensively considering the feature of each NPC and various conditions (e.g., a condition as to which target the NPC should attack in what kind of situation) in order to cause each NPC to take an intended behavior. In this case, for example, if the kinds or the number of characters are/is great, the developer should create, for each NPC, a very complicated algorithm in which not only the feature of the NPC but also the features of all the other NPCs are considered, in order to cause each NPC to take a behavior intended by the developer. Therefore, it is difficult to cause each NPC to take the intended behavior.

In contrast to the above method, in the exemplary embodiment, since a fight target for determining an attack target is set by using a fighting group, the algorithm is prevented from becoming complicated. As a result, each NPC is more likely to take the behavior intended by the developer. Therefore, the behavior of each NPC is more likely to become natural.

Moreover, in the exemplary embodiment, the fight target described above is not used as an attack target as it is, but a process of setting a fight target by using a fighting group and a process of determining an attack target based on a fight target are separated from each other. These two processes being separated makes it easy to change the feature of each NPC. For example, when the feature of a certain NPC needs to be changed, if the process of determining an attack target of this NPC is changed, the process of setting a fight target and even the process of determining an attack target of another NPC based on the set fight target may not necessarily be changed and may be maintained as they are. Therefore, in the exemplary embodiment, such a partial change can be easily performed. Thus, the operation algorithm of a certain NPC can be easily adjusted, and the NPC is more likely to take a behavior intended by the developer.

Although described in detail later, in the exemplary embodiment, in the fight target setting process, a fight target is set taking into account the whole situation in the game space. The whole situation in the game space means not only the situation regarding an NPC for which a fight target is set, but also the situations of the other characters. For example, in the exemplary embodiment, the fight target is set taking into account whether or not the respective characters are in the fightable states, which characters are set as fight targets for the other characters, and the like, as the whole situation in the game space. Therefore, the game system 1 can manage the behaviors of the respective characters in the fight while considering the whole situation in the game space. This realizes more natural behaviors in the fight as a whole. Meanwhile, in the attack target determining process, an attack target is determined according to the algorithm of each NPC, taking into account the situation of each individual character (e.g., whether or not this character recognizes a fight target, whether or not this character has been subjected to a specific attack, and the like). This makes the behavior of each NPC natural, and allows each NPC to take a behavior in which the feature of the NPC is reflected.

2-3. Specific Example of Setting of Fighting Group

Figure 9:
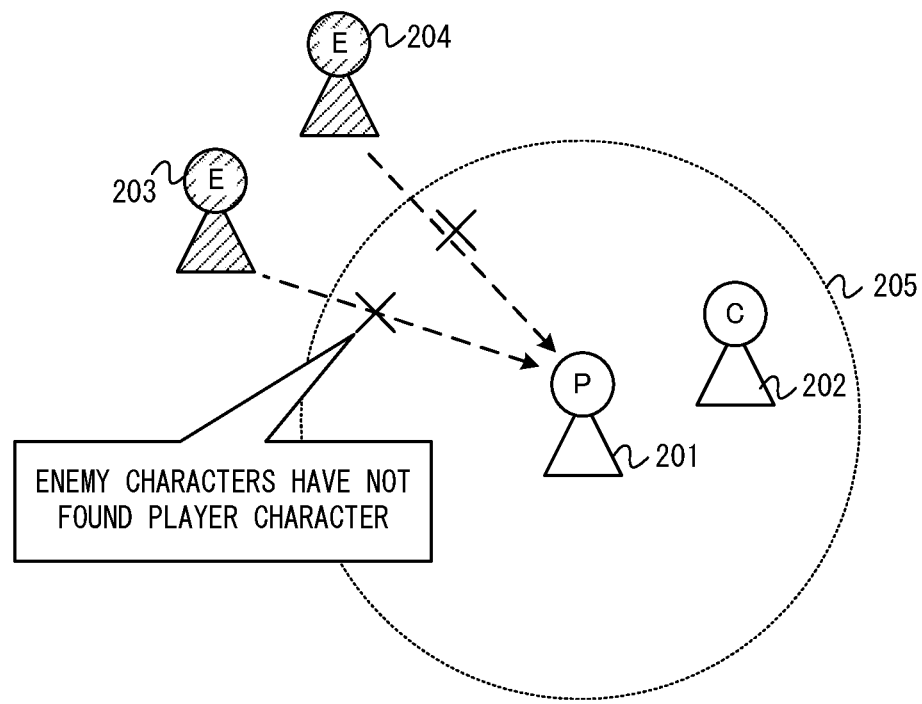
FIG. 9 shows an example of characters placed in a game space.

Next, an example of a fighting group setting method will be described by using a specific example. FIG. 9 shows an example in which characters are placed in a game space. In the example shown in FIG. 9, a player character 201, a companion character 202, and enemy characters 203 and 204 are placed in the game space. In the situation shown in FIG. 9, the enemy characters 203 and 204 have not yet found the player character 201 and the companion character 202 (see dotted line arrows in FIG. 9).

In the exemplary embodiment, the game system 1 causes a character set in the fightable state, among the characters placed in the game space, to participate in a fighting group under a certain condition. That is, the game system 1 determines whether or not the character in the fightable state should be caused to participate in the fighting group.

The game system 1 sets each NPC in either a non-fighting state or a fightable state. The non-fighting state is a state in which the NPC does not fight, and the fightable state is a state in which the NPC is ready to fight (i.e., the NPC can make a motion regarding a fight). The non-fighting state may be regarded as a state in which the NPC does not intend to fight, and the fightable state may be regarded as a state in which the NPC intends to fight. The fightable state may also be regarded as a state during a fight or a preparation state for a fight. When the NPC is in the fightable state, the NPC is controlled to perform a motion regarding an attack to a hostile character (i.e., a motion of moving toward the hostile character, or a motion of attacking the hostile character).

In the exemplary embodiment, a companion character can be caused to appear in the game space and leave the game space according to an instruction of the player. In the exemplary embodiment, the companion character is set in the fightable state while it appears in the game space. Therefore, in the situation shown in FIG. 9, the companion character 202 is determined to be in the fightable state.

Meanwhile, an enemy character is set in the non-fighting state when it has not yet found a character in a hostile category (i.e., a player character, a companion character, or a third force character), and is set in the fightable state when it has found a character in a hostile category. In the situation shown in FIG. 9, since the enemy characters 203 and 204 have not yet found the player character 201 and the companion character 202, the enemy characters 203 and 204 are set in the non-fighting states.

In the exemplary embodiment, the game system 1 determines, for each NPC, whether or not the NPC has found a character in a hostile category. For example, when another character is present in a discovery area that is set based on the position and the direction of the NPC, the game system 1 determines that the NPC has found the another character. The discovery area is, for example, an area that has a predetermined angle to the left and the right with the forward direction of the NPC in the center and is within a predetermined distance from the NPC. The size and the shape of the discovery area is optional, and may be the same for the respective NPCs, or may vary depending on the categories or the kinds of the NPCs.

In the exemplary embodiment, when an NPC has found another character, the game system 1 stores therein the another character as a character that the NPC has recognized. Even when another character has once been located in a discovery area of an NPC and thereafter moved out of the discovery area, the another character is stored as a character that the NPC has recognized. In the exemplary embodiment, the game system 1 stores therein a character that each NPC has recognized.

Among the NPCs, a third force character is set in the non-fighting state when it has not yet found a character in a hostile category (i.e., a player character, a companion character, or an enemy character), and is set in the fightable state when it has found a character in a hostile category.

The method of determining whether or not an NPC is in the fightable state is optional, and the criterion may also be optional. For example, in other embodiments, the companion character 202 may be set in the non-fighting state when the companion character 202 has not yet found a character in a hostile category (i.e., an enemy character or a third force character), and may be set in the fightable state when the companion character 202 has found a character in a hostile category. The companion character 202 may be set in the fightable state when the player character 201 has been found by a character in a hostile category. Moreover, in other embodiments, for example, there may be an enemy character or a third force character that is always set in the fightable state, and there may be an NPC that transitions from the non-fighting state to the fightable state according to a condition (e.g., the NPC having been attacked) other than the above condition.

In the exemplary embodiment, the player character 201 is always set in the fightable state. Since the motion of the player character 201 is designated by the player, the motion of the player character 201 is not influenced by whether or not the player character 201 is in the fightable state. In the exemplary embodiment, the game system 1 sets the player character 201 always in the fightable state in order to always perform determination as to whether or not the player character 201 should participate in the fighting group. In other embodiments, the player character 201 may also be switched between the fightable state and the non-fighting state, according to a predetermined criterion.

When setting a fighting group, firstly, the game system 1 selects a character in the fightable state. When the character in the fightable state has been selected, the game system 1 determines group setting conditions as to the selected character, thereby determining whether or not to set a fighting group. In the exemplary embodiment, various group setting conditions for setting a fighting group are prepared (see FIG. 10), and the game system 1 determines the group setting conditions for each character in the fightable state, thereby managing the fighting group.

FIG. 10 shows an example of the group setting conditions. In the exemplary embodiment, a participation condition, a generation condition, a dissolution condition, a division condition, and an integration condition are set as the group setting conditions. The participation condition is a condition for a character to participate in a fighting group in which another character is a representative. The generation condition is a condition for generating a fighting group in which a character itself is a representative. The dissolution condition is a condition for dissolving a fighting group in which a character itself is a representative. The division condition is a condition for causing a new fighting group to be divided from a fighting group in which a character itself participates. The integration condition is a condition for integrating a fighting group in which a character itself is a representative, with another fighting group (specifically, causing the fighting group in which the character itself is a representative to disappear and be integrated with the another fighting group). In the exemplary embodiment, the game system 1 determines, for each character, the group setting conditions, thereby causing the character to participate in a fighting group, generating a new fighting group, dissolving a fighting group, dividing a fighting group, and integrating a fighting group with another fighting group. In other embodiments, the group setting conditions are not limited to the five conditions described above. The group setting conditions may not include some of the five condition, and may include a condition other than the five conditions.

In the exemplary embodiment, when a fighting group has been generated with the generation condition having been satisfied, a character that has satisfied the generation condition is set as a representative of the fighting group. Dissolution, division, or integration of a fighting group is determined according to whether or not a representative of the fighting group has satisfied the dissolution condition, the division condition, or the integration condition, respectively. It can be said that the representative of the fighting group is a character used for determining a change in the fighting group (specifically, dissolution, division, or integration).

As shown in FIG. 10, in the exemplary embodiment, the group setting conditions are set for each of the character categories. Although not shown in FIG. 10, in the exemplary embodiment, the group setting conditions for the character in the third force category are identical to the group setting conditions for the character in the enemy category.

The group setting conditions set for one category may not necessarily include all of the participation condition, the generation condition, the dissolution condition, the division condition, and the integration condition. For example, in the example shown in FIG. 10, the group setting conditions set for the player category include only the generation condition. The reason is as follows. That is, in the exemplary embodiment, for the player character, a fighting group in which the player character is a representative is preferentially generated, and the player character does not participate in a fighting group in which another character is a representative.

In the situation shown in FIG. 9, the game system 1 determines the group setting conditions as to each character in the fightable state to determine whether or not to set a fighting group. As described above, in the exemplary embodiment, the game system 1 always determines the group setting conditions for the player character 201 which is always in the fightable state. In addition, as shown in FIG. 10, the generation condition as to the player character 201 is that "a fighting group in which the player character 201 participate is not generated". Therefore, the game system 1 always sets a fighting group in which the player character 201 is a representative. Since the conditions other than the generation condition are not set for the player character 201, determination as to the other conditions is not performed.

Next, since the enemy characters 203 and 204 are in the non-fighting states in the situation shown in FIG. 9, determination as to the group setting conditions is not performed. Therefore, the enemy characters 203 and 204 do not participate in the fighting group in which the player character 201 is a representative.

In the exemplary embodiment, for the enemy characters 203 and 204, like the player character 201, the generation condition that "a fighting group in which own character participates is not generated" is set (see FIG. 10). Therefore, if the enemy characters 203 and 204 are in the fightable states, fighting groups in which the respective enemy characters 203 and 204 are representatives are generated. However, in the situation shown in FIG. 9, since the enemy characters 203 and 204 are in the non-fighting states, fighting groups regarding the enemy characters 203 and 204 are not generated.

Since the companion character 202 is in the fightable state in the situation shown in FIG. 9, determination as to the group setting conditions is performed. The participation condition as to the companion character 202 is that the character is present in a group area 210 set based on the position of the player character 201 that is a representative of the fighting group, and a fight target can be set for the character (i.e., an enemy character or a third force character participates in this fighting group) (see FIG. 10). The group area 210 is an area within a predetermined distance from the player character 201, for example. In the situation shown in FIG. 9, since the enemy characters 203 and 204 do not participate in the fighting group as described above, the participation condition is not satisfied as to the companion character 202. Therefore, the companion character 202 does not participate in the fighting group.

In the situation shown in FIG. 9, since a fighting group in which the companion character 202 is a representative is not set, determinations for the dissolution condition, the division condition, and the integration condition as to the companion character 202 are not performed, and therefore dissolution, division, and integration of a fighting group are not performed.

As described above, in the situation shown in FIG. 9, a fighting group in which the player character is a representative does not include other characters. Thus, no fight target is set in the fighting group, and therefore, such a fighting group is not substantially set.

Figure 11:
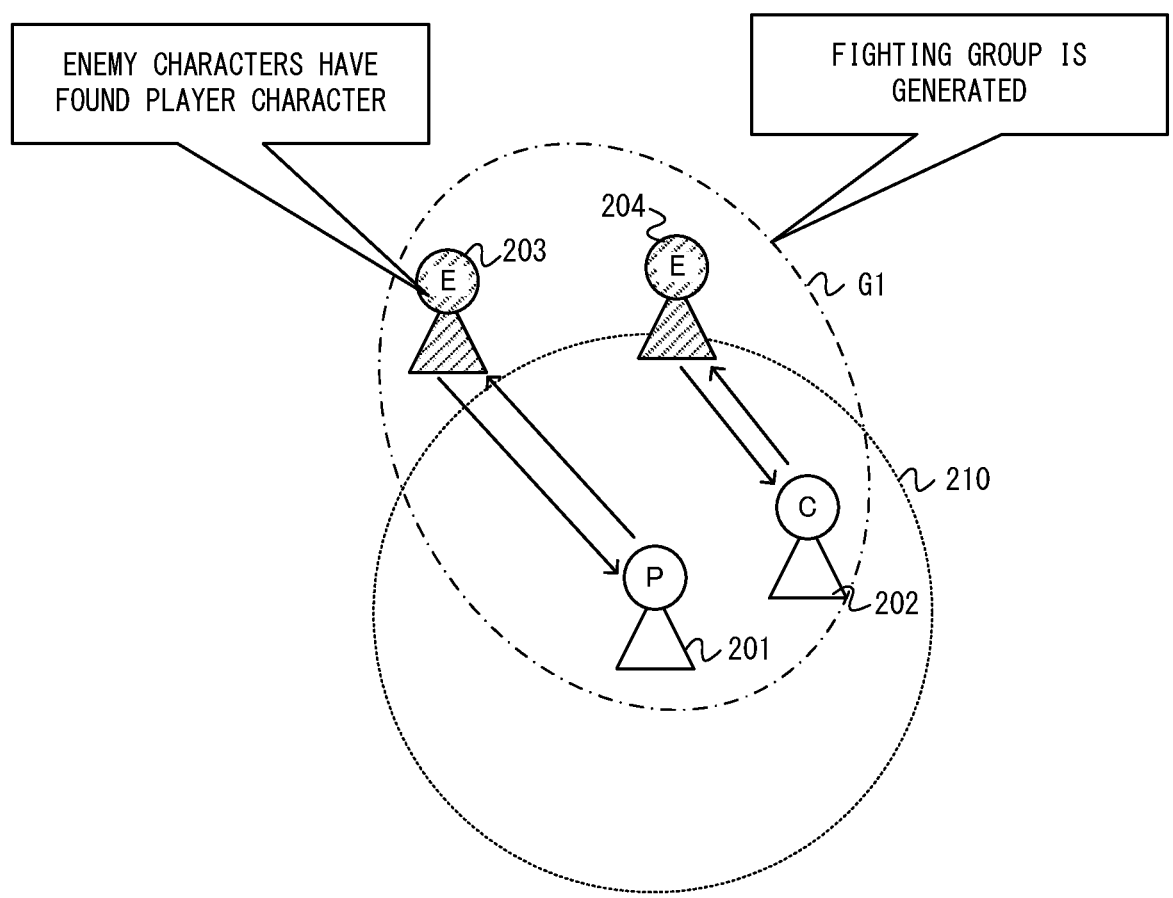
FIG. 11 shows an example of a situation in which enemy characters have found a player character, from the situation shown in FIG. 9.

FIG. 11 shows an example of a situation in which the enemy characters 203 and 204 have found the player character 201, from the situation shown in FIG. 9. In the situation shown in FIG. 11, as in the situation shown in FIG. 9, the game system 1 determines the group setting conditions for each character, thereby managing a fighting group.

In the situation shown in FIG. 11, a fighting group G1 in which the player character 201 is a representative is set, as in the situation shown in FIG. 9. In the situation shown in FIG. 11, the enemy characters 203 and 204 have found the player character 201 and therefore are in the fightable states, and determination as to the group setting conditions is performed for the enemy characters 203 and 204.

The participation condition as to the enemy character is that the enemy character recognizes a character (here, the player character) that is a representative of the fighting group and a fight target can be set for the enemy character (see FIG. 10). The phrase "a fight target can be set" means that a character that can be the fight target (for the enemy character, the player character, a companion character, or a third force character) participates in the fighting group. In the situation shown in FIG. 11, since the enemy characters 203 and 204 have found the player character 201, the player character 201 is stored as the "recognized character" described above, for the enemy characters 203 and 204. Therefore, the participation condition is satisfied for the enemy characters 203 and 204, and the game system 1 causes the enemy characters 203 and 204 to participate in the fighting group G1.

As described above, in the situation shown in FIG. 11, the enemy characters 203 and 204 participate in the fighting group in which the player character 201 is a representative. In the situation shown in FIG. 11, the companion character 202 is positioned in a group area 210 based on the player character 201. Therefore, since the companion character 202 is positioned in the group area 210 and a fight target can be set for the companion character 202 (i.e., an enemy character or a third force character participates in the fighting group), the participation condition as to the companion character 202 is also satisfied. Thus, in the situation shown in FIG. 11, the game system 1 causes the companion character 202 to participate in the fighting group.

As described above, in the situation shown in FIG. 11, the fighting group G1 in which the characters 201 to 204 participate is set (see FIG. 11). In this case, fight targets are set among the characters 201 to 204 in the fighting group G1 (see arrows in FIG. 11). A specific method of setting fight targets will be described later.

In the exemplary embodiment, the game system 1 performs the determination as to the group setting conditions once every predetermined time (e.g., 1 frame time) during the game. This enables the fighting group to dynamically change even while the characters are fighting. For example, in the situation shown in FIG. 11, if the enemy characters 203 and 204 are defeated by the player character 201 and the companion character 202 and disappear, the situation becomes identical to that shown in FIG. 9, and therefore, the fighting group G1 is not substantially set. For example, in the situation shown in FIG. 11, if a new enemy character other than the enemy characters 203 and 204 has found the player character 201, this new enemy character participates in the fighting group G1.

Figure 12:
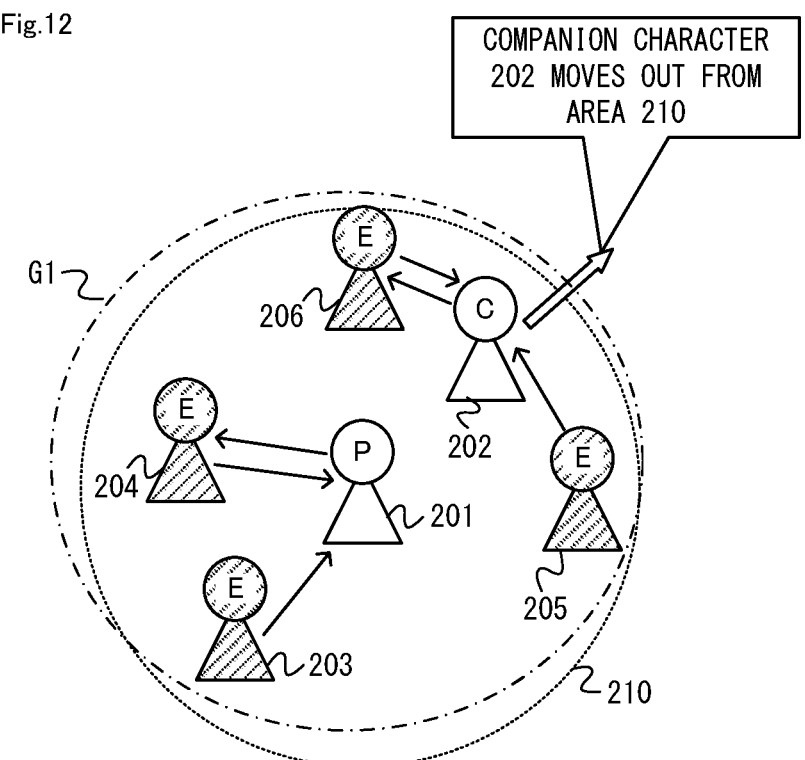
FIG. 12 shows an example of one fighting group in which a plurality of characters participate.

FIG. 12 shows an example of one fighting group in which a plurality of characters participate. FIG. 12 shows a situation in which new enemy characters 205 and 206 participate in the fighting group G1, from the situation shown in FIG. 11. In the situation shown in FIG. 12, a fight target for the enemy characters 205 and 206 is set to the companion character 202.

In the situation shown in FIG. 12, a case where the companion character 202 moves out of a group area 210 based on the player character 201 is considered (see FIG. 12). In the exemplary embodiment, the division condition as to the companion character 202 is that the companion character is positioned outside the group area 210 based on the player character 201 being a representative of the fighting group in which the companion character participates, and the companion character itself is a fight target (see FIG. 10). In the above case, since the division condition as to the companion character 202 is satisfied, the game system 1 divides the fighting group G1.

Figure 13:
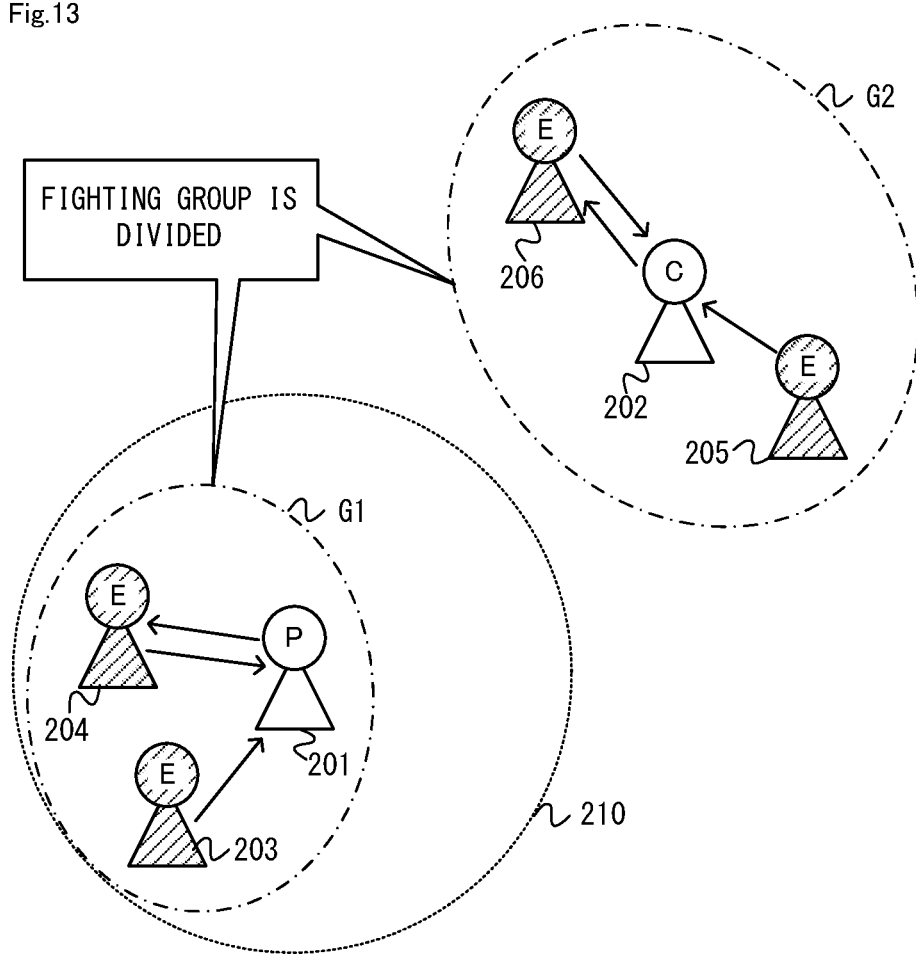
FIG. 13 shows an example of a case where the fighting group is divided, from the situation shown in FIG. 12.

FIG. 13 shows an example of a case where the fighting group is divided, from the situation shown in FIG. 12. When the division condition is satisfied for the companion character 202, the game system 1 generates a new fighting group G2 in which the companion character 202 is a representative. In this case, the game system 1 causes the enemy characters 205 and 206, whose fight target at the time of division has been the companion character 202, to participate in the new fighting group G2. In addition, the game system 1 causes the characters 202, 205, 206, which are caused to participate in the fighting group G2, to withdraw from the fighting group G1. Thus, in the situation shown in FIG. 13, the fighting group G1 in which the player character 201 is a representative and the enemy characters 203 and 204 participate, and the fighting group G2 in which the companion character 202 is a representative and the enemy characters 205 and 206 participate, are set. Thus, one fighting group is divided into two fighting groups (see FIG. 13).

In the exemplary embodiment, no division condition is set for the player character and the enemy character (see FIG. 10). Therefore, in the exemplary embodiment, a fighting group in which the player character or an enemy character is a representative is not newly generated by division.

As described above, in the exemplary embodiment, at least on the condition that the positional relationship between a character (e.g., the companion character 202) that participates in a first fighting group (e.g., the fighting group G1 shown in FIG. 12) and is not a representative of the first fighting group, and a character (e.g., the player character 201) that is a representative of the first fighting group, has become a positional relationship more distant than a predetermined criterion (e.g., the companion character 202 has moved out of the group area 210), the game system 1 newly generates a second fighting group (e.g., the fighting group G2 shown in FIG. 13) in which the character that is not the representative of the first fighting group is a representative.

In the exemplary embodiment, a fight target for a character is selected from among characters that participate in the same fighting group as the character. Therefore, if division of the fighting group is not performed even when the companion character 202 is distant from the player character 201 as shown in FIG. 13, the behavior of an NPC may become unnatural. For example, in the case where a character that is hostile to the NPC and does not participate in the same fighting group as the NPC is located near to the NPC while a character that participates in the same fighting group as the NPC but is positioned distant from the NPC is set as a fight target, the NPC may take an unnatural behavior such that the NPC moves toward the distant character to attack the character even through the hostile character is present near the NPC. In contrast to the above case, in the exemplary embodiment, since division of a fighting group is performed, the behavior intended by the developer can be easily realized, and the possibility of the unnatural behavior as described above can be reduced.

In the exemplary embodiment, in the determination as to the division condition, the game system 1 determines whether or not the positional relationship between the two characters to be the representatives is a positional relationship more distant than the predetermined criterion, by using an area (i.e., the group area 210) that is set based on the position of one of the characters, and the position of the other character. In other embodiments, the game system 1 may determine whether or not the positional relationship between the two characters has become a positional relationship more distant than the predetermined criterion, according to whether or not an area set based on one of the characters overlaps an area set based on the other character. Moreover, for example, the game system 1 may determine whether or not the positional relationship between the two characters has become a positional relationship more distant than the predetermined criterion, according to the position of one of the characters and the position of the other character (e.g., according to whether or not a distance between the two characters is equal to or greater than a predetermined distance). The specific content of the division condition is not limited to the example shown in FIG. 10, and another condition may be adopted.

The game system 1 causes another character (in FIG. 13, the enemy characters 205 and 206) whose fight target in the first fighting group has been a character (in FIG. 13, the companion character 202) to be a representative of the second fighting group, to participate in the second fighting group. This reduces the possibility that the fight target is changed before and after generation of the new fighting group, whereby the behavior of each NPC in the fight can be made natural as intended by the developer. In other embodiments, even when generating the second group, the game system 1 may not necessarily cause the another character having been set as the fight target in the first fighting group, to participate in the second fighting group. For example, the game system 1 may determine the participation condition as to each character when generating the second fighting group, to select characters that participate in the first fighting group and characters that participate in the second fighting group.

In the case where the another character is caused to participate in the second fighting group, how to set a fight target in the second fighting group is optional. For example, in the exemplary embodiment, in the above case, the game system 1 sets a fight target for each character in the second fighting group to the same character as that before generation of the second fighting group (i.e., to the character having been the fight target in the first fighting group). In other embodiments, in the above case, the game system 1 may reset the fight target when generating the second fighting group (whereby the fight target is changed from that in the first fighting group).

In other embodiments, the condition for dividing a fighting group is not limited to the above condition, and another condition may be adopted. Furthermore, in other embodiments, in addition to dividing a fighting group with a companion character being a representative, the game system 1 may divide a fighting group with another NPC or the player character being a representative. Moreover, in other embodiments, the game system 1 may not divide a fighting group.

When the fighting group G2 in which the companion character 202 is a representative is set as in the situation shown in FIG. 13, the game system 1 determines the dissolution condition as to the companion character 202. In the exemplary embodiment, the dissolution condition as to the companion character 202 is that the companion character is not a fight target for another NPC in a fighting group in which the companion character is a representative (see FIG. 10). Therefore, the dissolution condition is satisfied if the companion character 202 has defeated the enemy characters 205 and 206 in the situation shown in FIG. 13, and the game system 1 dissolves the fighting group G2.

As described above, determination as to the group setting conditions is repeatedly performed once every predetermined time. Therefore, after dissolving the fighting group because of the dissolution condition having been satisfied, the game system 1 determines the group setting condition as to the companion character having been a representative of the fighting group. Therefore, if the participation condition is satisfied as to the companion character when the fighting group is dissolved, the companion character participates in a fighting group that satisfies the participation condition. Meanwhile, if the participation condition is not satisfied as to the companion character when the fighting group is dissolved, the companion character does not participate in the fighting group.

As described above, in the exemplary embodiment, on the condition that a character (e.g., a companion character) that is a representative of a fighting group is not set as a fight target for any of the other characters, the game system 1 dissolves the fighting group, and determines, based on the group setting condition, a fighting group in which the character having been the representative of the dissolved fighting group should participate. Thus, even after dissolution of the fighting group, each NPC can be caused to take a natural behavior intended by the developer.

In other embodiments, the content of the dissolution condition is optional, and a dissolution condition whose content is different from that of the exemplary embodiment may be set. The dissolution condition may not be set, and in this case, the set fighting group may not be dissolved.

In the exemplary embodiment, the game system 1 determines the integration condition as to the companion character 202. In the exemplary embodiment, the integration condition as to the companion character 202 is that the companion character is a representative of a fighting group and is positioned in a group area of another fighting group in which another character higher in priority than itself is a representative (see FIG. 10). In the exemplary embodiment, the "another character higher in priority than itself" is the player character, or another companion character that is a representative of a fighting group in which more characters participate than in its own fighting group. In the exemplary embodiment, the priority is set according to the categories of characters, and the player character is higher in priority than the companion character. When two characters are in the same category, a character that is a representative of a fighting group in which more characters participate is set to be higher in priority than the other character.

For example, when the companion character 202 has approached the player character 201 and thereby the situation shown in FIG. 13 has changed to the situation shown in FIG. 12, the fighting group G2 in which the companion character 202 is a representative is integrated with the fighting group G1 in which the player character 201 is a representative. As a result, one fighting group G1 in which the characters 201 to 206 participate is set. The specific process for integration is optional. In other embodiments, the game system 1 may once dissolve both the fighting group G1 and the fighting group G2, and newly generate an integrated fighting group. In this case, a representative of the integrated fighting group is optional. A character different from the representatives of the fighting groups before the integration may become a representative.

In the exemplary embodiment, integration of a fighting group in which an enemy character is a representative may be performed. The integration condition as to the enemy character is that the enemy character is a representative of a fighting group, and recognizes a character that is a representative of another fighting group in which another character higher in priority than itself is a representative (see FIG. 10). Therefore, when the integration condition as to the enemy character has been satisfied, the fighting group in which the enemy character is a representative is integrated with the another fighting group regarding the integration condition.

As described above, at least on the condition that the positional relationship between a character that is a representative of a certain fighting group and a character that is a representative of another fighting group has become a positional relationship closer than a predetermined criterion (e.g., the companion character 202 is positioned in the group area of the fighting group of the player character 201), the game system 1 integrates the certain fighting group and the another fighting group into one fighting group.

In the case where characters that participate in different fighting groups are positioned near to each other, there may be a situation in which a character that is hostile to a certain NPC and participates in a fighting group other than a fighting group in which the NPC participates, is positioned nearer to the NPC than a character that is hostile to the NPC and participates in the same fighting group as the NPC. In such a situation, if the NPC moves toward the distant hostile character and attacks this character even through the hostile character (which participates in the other fighting group) is present near the NPC, this behavior of the NPC is unnatural. In contrast to the above, in the exemplary embodiment, two fighting groups are integrated into one fighting group as described above. Therefore, for example, in the above situation, the hostile character near the NPC can be set as a fight target for the NPC. Thus, the possibility that the NPC takes an unnatural behavior not intended by the developer can be reduced.

In the exemplary embodiment, in the determination regarding the integration condition, the game system 1 determines whether or not the positional relationship between the two characters to be representatives is a positional relationship closer than the predetermined criterion, by using an area that is set based on the position of one of the characters, and the position of the other character. In other embodiments, also for the integration condition, the game system 1 may determine whether or not the positional relationship between the two characters has become a positional relationship closer than the predetermined criterion, according to whether or not an area set based on one of the characters overlaps an area set based on the other character. Moreover, for example, the game system 1 may determine whether or not the positional relationship between the two characters has become a positional relationship closer than the predetermined criterion, according to the position of one of the characters and the position of the other character (e.g., according to whether or not a distance between the two characters is equal to or less than a predetermined distance). The specific content of the integration condition is not limited to the example shown in FIG. 10, and another condition may be adopted.

In other embodiments, the content of the integration condition is optional, and an integration condition whose content is different from that of the exemplary embodiment may be set. The integration condition may not be set, and in this case, integration of fighting groups may not be performed.

As described above, in the exemplary embodiment, the game system 1 determines, for each NPC, a fighting group in which an NPC in the fightable state participates, based on the group setting conditions set for the NPC (e.g., the game system 1 determines a fighting group in which the NPC participates, based on the participation condition or the integration condition, or determines a fighting group in which the NPC is a representative, based on the generation condition or the division condition). The phrase "for each NPC, based on the group setting conditions set for the NPC" means that the fighting group may be determined based on either the mode in which the group setting conditions are set for each category as in the exemplary embodiment or the mode in which the group setting conditions are set for each NPC. Therefore, the game system 1 can set, for each NPC, the behavior of the NPC during the fight. In this case, the game system 1 sets the group setting conditions along the feature of the NPC, thereby causing the NPC to take a behavior according to the feature of the NPC. For example, as for an aggressive NPC, the game system 1 may set group setting conditions that make the NPC more likely to participate in a fighting group, thereby making the NPC more likely to participate in the fight. As for a coward NPC, the game system may set group setting conditions that make the NPC less likely to participate in a fighting group, thereby making the NPC less likely to participate in the fight.

In the exemplary embodiment, each of the plurality of NPCs is assigned to any one of the plurality of categories (specifically, the companion category, the enemy category, and the third force category). The group setting conditions are set for each category (see FIG. 10). The game system 1 determines a fighting group in which an NPC in the fightable state is caused to participate, based on the group setting conditions set for the category to which the NPC belongs. This allows the game system 1 to make the behaviors of the NPCs during the fight different by the categories. For example, the game system 1 can cause each NPC to take a behavior according to the feature of the category of the NPC.

In addition, since the game system 1 may store therein the group setting conditions for each category, the amount of data of the group setting conditions can be reduced, and development costs for the group setting conditions can be reduced. In other embodiments, the group setting conditions may not necessarily be set for each category, and may be set for each character, for example.

In the exemplary embodiment, the game system 1 sets a character to be a representative of a fighting group from among the NPCs in the fightable states and the player character, and generates a fighting group for each character to be a representative. In addition, among the NPCs in the fightable states (in other embodiments, the player character may be included), the game system 1 causes an NPC that satisfies the participation condition as to a fighting group in which a representative is set, to participate in this fighting group. Therefore, setting a character to be a representative can facilitate management of the fighting group.

Moreover, in the exemplary embodiment, the game system 1 performs dissolution of a fighting group or integration of a fighting group with another fighting group, based on the group setting conditions set for a character to be a representative of the fighting group. Therefore, the game system 1 can easily determine dissolution and/or integration of the fighting group, based on the character to be a representative. In the exemplary embodiment, the dissolution condition for dissolving a fighting group and the integration condition for integrating a fighting group with another fighting group are set for each category. However, in other embodiments, the dissolution condition and/or the integration condition may not necessarily be set for each category, and may be set for each character or each kind of character.

In other embodiments, a representative may not be set in a fighting group. In addition, the game system 1 may determine the dissolution condition and the integration condition for each character that participates in a fighting group.

In the exemplary embodiment, the player character is always set as a representative of a fighting group. That is, the game system 1 sets a character to be a representative and characters to participate in a fighting group such that the player character is not caused to participate in the fighting group as a non-representative character. In this case, for example, when another fighting group is not generated, NPCs participate in the fighting group in which the player character is a representative, whereby a situation in which the player character fights against the NPCs is more likely to occur. Thus, the possibility of a situation in which only the NPCs fight and the player character does not participate in the fight, can be reduced. Moreover, chances for the player to perform game operations for the fight can be increased, thereby enhancing amusement of the game. In other embodiments, the game system 1 may cause the player character to participate in a fighting group in which an NPC is a representative.

Although in the examples shown in FIG. 9 to FIG. 13, the third force character is not placed in the game space, the same group setting conditions as those for the enemy category are set for the third force category. Therefore, even when the third force character is placed in the game space, setting of a fighting group is performed by a method similar to that shown in FIG. 9 to FIG. 13. Although described in detail later, the fight target setting method for the third force character is different from that for the enemy character.

2-4. Specific Example of Fight Target Setting Method

Next, an example of a method of setting a fight target in a fighting group will be specifically described. The game system 1 executes, for each fighting group, a process of setting fight targets for characters (i.e., the player character and the NPCs) that participate in the fighting group. As for one fighting group, a fight target for a character that participates in the fighting group is selected from among the other characters that participate in the fighting group.

In the exemplary embodiment, when a fighting group is newly generated, the game system 1 sets a fight target for each of characters that participate in the fighting group. In addition, when there is a change in the characters that participate in the fighting group, the game system 1 resets a fight target for each of the characters that participate in the fighting group. That is, the game system 1 performs setting of a fight target not only when a fighting group is newly generated but also when a character newly participates in the fighting group and when a character withdraws from the fighting group. When there is a change in the characters that participate in the fighting group, the fight having been performed with an intended natural behavior of each character before the change may become an unintended, unnatural behavior. In this regard, according to the exemplary embodiment, the resetting described above allows the fight target for each character to be appropriately reset, thereby realizing a natural fight as intended. For example, even when a new enemy character appears and thereby a new character participates in the fighting group or even when the player character defeats an enemy character and thereby the enemy character withdraws from the fighting group, the game system 1 can appropriately set a fight target for each character.

In the exemplary embodiment, when there is no change in the characters that participate in the fighting group, the game system 1 maintains the fight target for each of the characters that participate in the fighting group (i.e., does not reset the fight target). Therefore, it is possible to reduce the possibility that the behavior of each NPC becomes an unintended, unnatural behavior because the fight target is changed even though there is no change in the characters participating in the fighting group.

In other embodiments, the timing at which setting (including resetting) of a fight target is not limited to that described above. Setting of a fight target may not be performed at the timing described above, or may be performed at another timing. For example, the game system 1 may perform setting of a fight target at predetermined time intervals even if there is no change in the characters that participate in the fighting group.

In the exemplary embodiment, when setting a fight target for each of the characters in the fighting group, the game system 1 firstly divides the characters participating in the fighting group into two types based on the categories. Specifically, the game system 1 sets each character participating in the fighting group to either a first type or a second type. A first type character and a second type character are hostile to each other. That is, the game system 1 selects a fight target for a first type character from among second type characters, and selects a fight target for a second type character from among first type characters.

As described above, in the exemplary embodiment, each character participating in the fighting group is set to either of the two types, whereby setting of fight targets in the case where two hostile powers fight against each other is facilitated. In other embodiments, the kinds of types to which the characters are set are not limited to two kinds, and three or more kinds of types may be prepared. For example, in addition to the first type and the second type hostile to each other, a third type hostile to both the first type and the second type may be prepared. Moreover, in other embodiments, for example, the game system 1 may set fight targets without using such types (i.e., without performing setting of types).

In the exemplary embodiment, the player character and the companion character are set to the first type. This prevents the player character and the companion character from becoming fight targets for each other, thereby easily realizing cooperating behaviors of these characters. In other embodiments, the player character and the companion character may not necessarily be always set to the first type. For example, the player character and the companion character may be set to different types under a certain condition.

Figure 14:
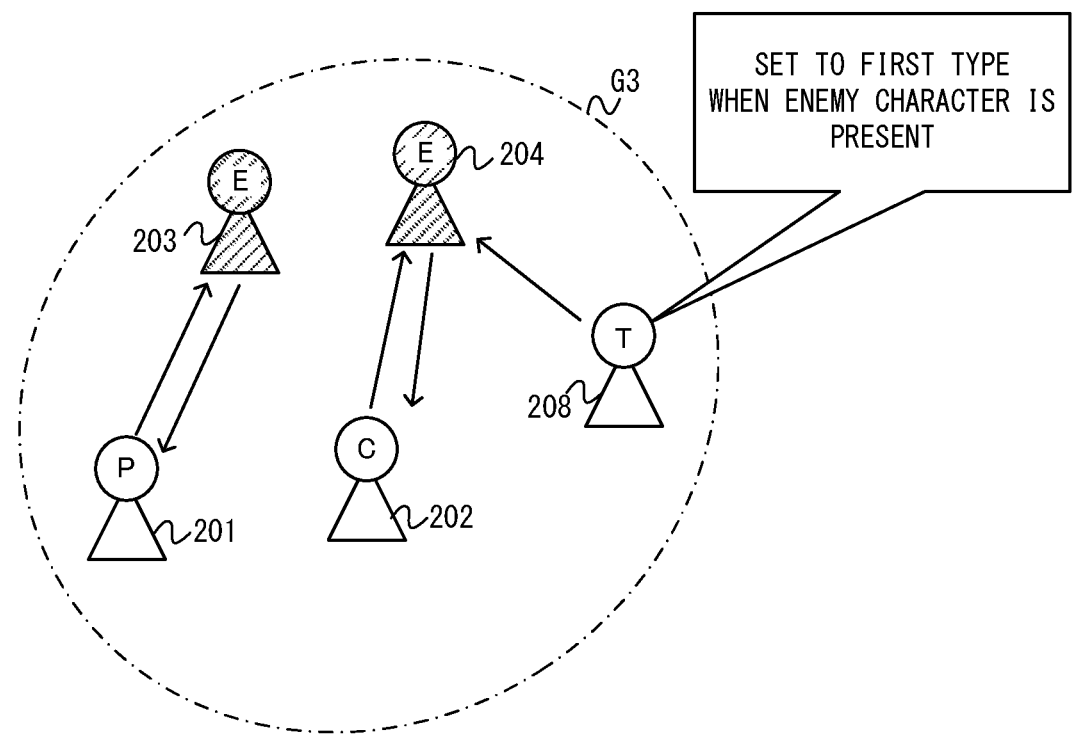
FIG. 14 shows an example of a fighting group in which a player character, a companion character, enemy characters, and a third force character participate.
Figure 15:
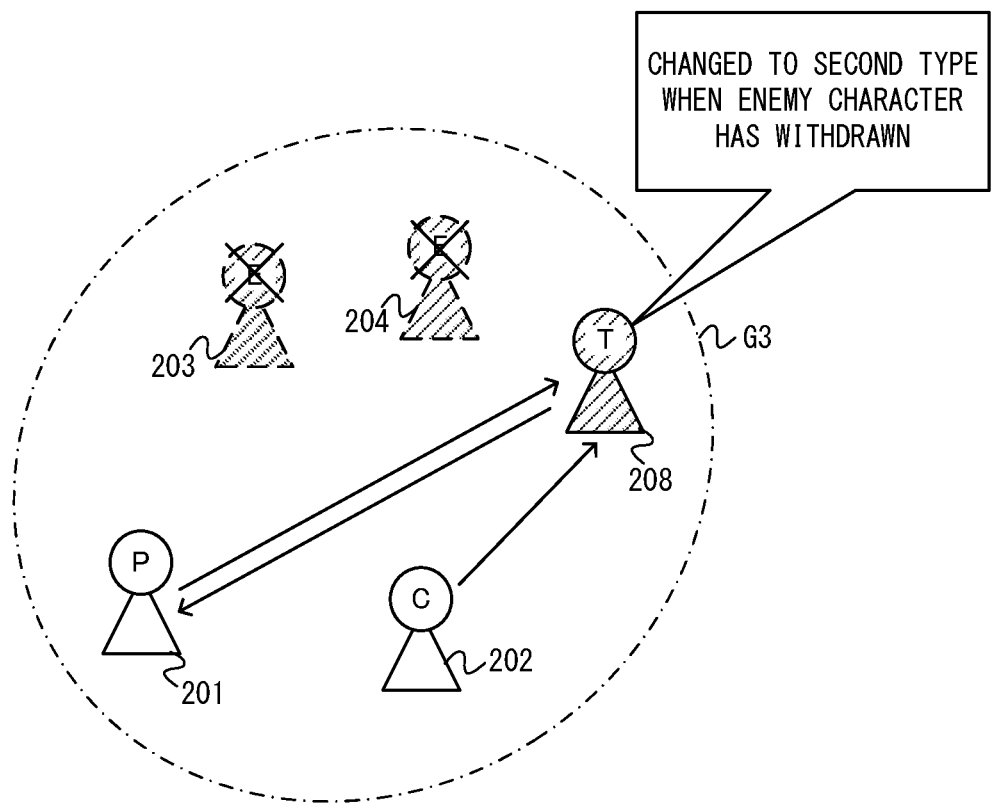
FIG. 15 shows an example of a fighting group in which a player character, a companion character, and a third force character participate.

The game system 1 sets the third force character to any of the above types, according to the other characters that participate in the same fighting group (more specifically, according to the categories of the other characters). FIG. 14 shows an example of a fighting group in which the player character, a companion character, enemy characters, and a third force character participate. As shown in FIG. 14, when enemy characters 203 and 204 participate as second type characters in a fighting group G3, a third force character 208 is set to the first type. In FIG. 14 and FIG. 15, the characters set to the second type are indicated by hatching. In the example shown in FIG. 14, either of the enemy characters 203 and 204, which are set to the second type, is set as a fight target for the player character 201, the companion character 202, and the third force character 208 which are set to the first type, and any of the player character 201, the companion character 202, and the third force character 208, which are set to the first type, is set as a fight target for the enemy characters 203 and 204 which are set to the second type (see arrows in FIG. 14).

In the exemplary embodiment, when the enemy character being the second type participates in a fighting group, the third force character is set to the first type regardless of whether or not the player character and the companion character participate in the fighting group. In the exemplary embodiment, there is a case where a fighting group in which only the enemy character and the third force character participate is set. In this case, the third force character is set to the first type, and the enemy character is set to the second type.

FIG. 15 shows an example of a fighting group in which the player character, a companion character, and a third force character participate. FIG. 15 shows a situation in which the enemy characters 203 and 204 have been defeated and have withdrawn from the fighting group G3, from the situation shown in FIG. 14. As shown in FIG. 15, when no enemy character being the second type participates in the fighting group G3, the third force character 208 is set to the second type. As described above, the player character 201 and the companion character 202 are set to the first type. Therefore, in the example shown in FIG. 15, the third force character 208, which is set to the second type, is set as a fight target for the player character 201 and the companion character 202 which are set to the first type, and either of the player character 201 and the companion character 202, which are set to the first type, is set as a fight target for the third force character 208 which is set to the second type (see arrows shown in FIG.

In the exemplary embodiment, there may be a situation in which the third force character 208 does not attack the player character 201 and the companion character 202 while the enemy characters 203 and 204 are present (see FIG. 14), but after the enemy characters 203 and 204 are defeated, the third force character 208, which have not attacked the player character 201 and the companion character 202, attacks these characters (see FIG. 15). Thus, in the exemplary embodiment, the third force character may attack the enemy character in cooperation with the player character and the companion character, or may be hostile to the player character and the companion character.

As described above, in the exemplary embodiment, each of the plurality of NPCs and the player character is assigned to any of the plurality of categories, and the plurality of categories include a first category (specifically, the companion category), a second category (specifically, the enemy category) hostile to the characters assigned to the first category, and a third category (specifically, the third force category) different from the first category and the second category. When a character in the first category and a character in the third category participate in the fighting group and a character in the second category does not participate in the fighting group (see FIG. 15), the game system 1 sets the character in the first category to the first type and sets the character in the third category to the second type. When the character in the first category, the character in the second category, and the character in the third category participate in the fighting group (see FIG. 14), the game system 1 sets the character in the first category and the character in the third category to the first type, and sets the character in the second category to the second type. Thus, it is possible to easily realize an intended behavior of an NPC such that the NPC is hostile to the character in the first category or fights in corporation with the character in the first category, according to the situation.

The method of setting the third force character to any type is not limited to the above method. For example, in other embodiments, the third force character may be set to the second type when the player character or the companion character participates in the fighting group, or may be set to the first type when the player character or the companion character does not participate in the fighting group and the enemy character participates in the fighting group. Thus, the game system 1 can cause the third force character to a behavior such that it is hostile to the enemy character, but attacks the player character or the companion character in cooperation with the enemy character when the player character or the companion character participates in the fighting group.

In the exemplary embodiment, as described above, the game system 1 sets a fight target for each character, based on the type to which the character is set. Here, in the exemplary embodiment, setting of a fight target is performed taking into account the following first condition and second condition, in addition to the type. Hereinafter, an example of a fight target setting method will be described with reference to FIG. 16.

Figure 16:
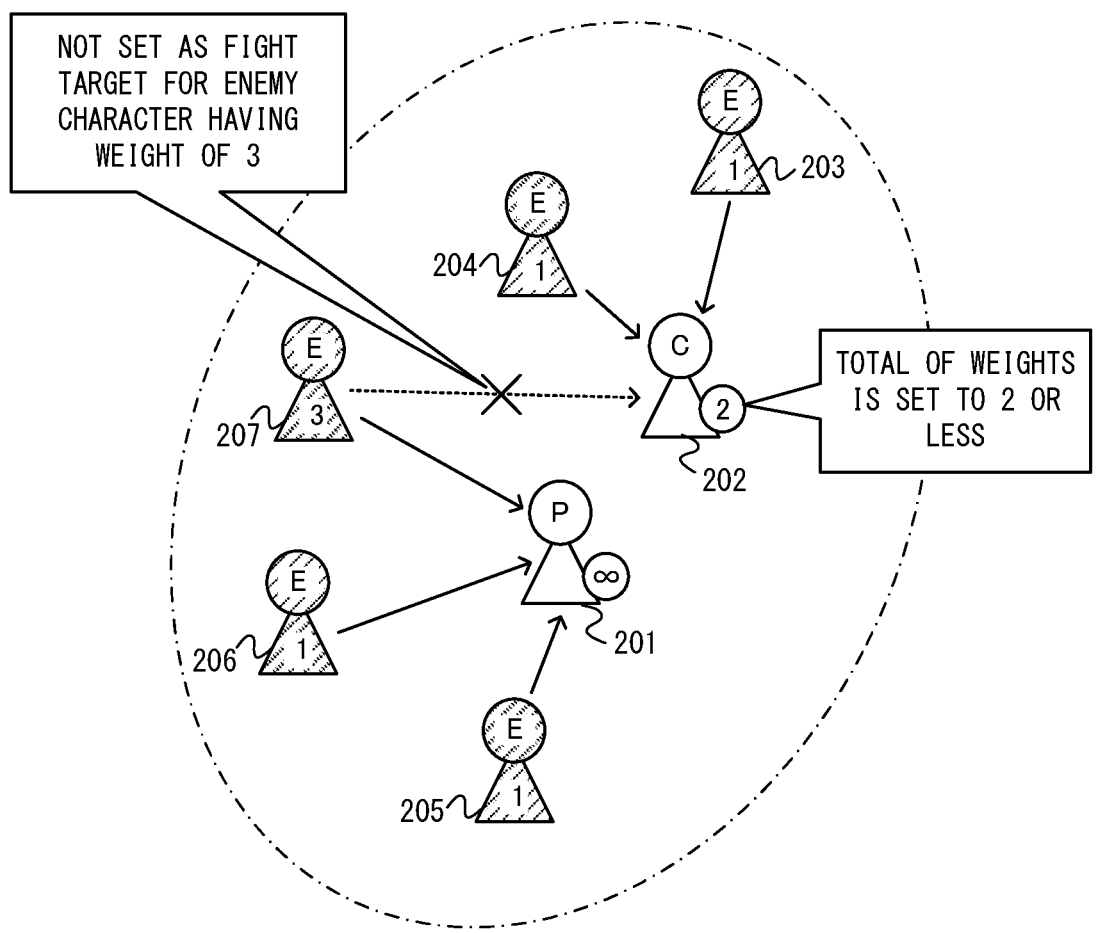
FIG. 16 shows an example of one fighting group in which a plurality of characters participate.

FIG. 16 shows an example of one fighting group in which a plurality of characters participate. In the situation shown in FIG. 16, a player character 201, a companion character 202, and five enemy characters 203 to 207 participate in a fighting group G4.

The first condition is that the total of weights set for characters, for which a certain character is set as a fight target, does not exceed a capacity set for the certain character. In the exemplary embodiment, information about a weight and a capacity is set for each character. When a certain character is set to be a fight target for a plurality of other characters, the capacity is an index indicating how many other characters are allowed to have the certain character as the fight target. The weight indicates the magnitude of influence of a certain character on the capacity of another character that is a fight target for the certain character. For example, when a certain character is set as a fight target for two characters each having a weight of 1, a weight applied to the certain character is 2 in total. In the exemplary embodiment, a fight target for each character is set according to the first condition such that the total of weights applied to a character does not exceed the capacity set for the character.

In the example shown in FIG. 16, it is assumed that the capacity of the player character 201 is set to be infinite, and the capacity of the companion character 202 is set to 2 (see the numbers in circles appended to the characters 201 and 202 shown in FIG. 16). In addition, the weight of each of the enemy characters 203 to 206 is set to 1, and the weight of the enemy character 207 is set to 3 (see the numbers appended to the characters 203 to 207 shown in FIG. 16). The capacity and the weight of each character may be set to any value. In the exemplary embodiment, the capacity and the weight are set for each kind (e.g., tribe) of character. For example, the capacity and the weight of a strong character may be set to large values.

In the example shown in FIG. 16, in order to satisfy the first condition, setting of fight targets for the companion character 202 is performed such that the capacity "2" thereof is not exceeded. That is, regarding the enemy characters 203 to 206 each having a weight of 1, the number of enemy characters for which the companion character 202 is set as a fight target is 2 at maximum, and the companion character 202 cannot be set as a fight target for three or more enemy characters. Furthermore, the companion character 202 cannot be set as a fight target for the enemy character 207 having a weight of 3.

Meanwhile, since the capacity of the player character 201 is infinite, there is no upper limit to the number of enemy characters for which the player character 201 is set as a fight target.

As described above, in the exemplary embodiment, the first type character (e.g., the player character or the companion character) is provided with at least information indicating the capacity in the case where this character becomes a fight target for the second type character (e.g., the enemy character). In addition, the second type character is provided with at least information indicating the weight of this character in the case where the first type character is set as a fight target for the second type character. The game system 1 sets fight targets for the second type character such that, in the fighting group, the magnitude based on the weights set for one or more second type characters for which one first type character becomes a fight target, does not exceed the capacity set for the first type character to be the fight target. Thus, the capacity being set for each character reduces the possibility that fight targets unintendedly concentrate on one character (e.g., only one character becomes a fight target) and thereby the behavior of each character becomes an unintended, unnatural one. Furthermore, the weight being set for each character enables setting of a fight target to be performed while reflecting the feature of the character so that, for example, a specific first type character is not set as a fight target for a specific second type character. In other embodiments, the game system 1 may not set the information about the capacity and the weight of each character, and may set a fight target by a method using neither a capacity nor a weight.

The "information indicating the capacity" and the "information indicating the weight" may not necessarily be numerical values, and may be any indices indicating the magnitude of the capacity and the magnitude of the weight, respectively. For example, the "information indicating the capacity" may indicate any one of "high level", "intermediate level", and "low level", and the "information indicating the weight" may indicate any one of "large", "medium", and "small". In this case, as for a character whose capacity is set to the high level, this character may be allowed to be set as a fight target for up to one character whose weight is large, as a fight target for up to two characters whose weights are medium, or as a fight target for up to five characters whose weights are small, for example. Meanwhile, as for a character whose capacity is set to the low level, this character may be inhibited to be set as a fight target for a character whose weight is large or medium, and may be allowed to be set as a fight target for up to three characters whose weights are small, for example.

The "magnitude based on the weights" is the total value of the numerical values indicating the weights of the characters in the exemplary embodiment, but is not limited thereto. The "magnitude based on the weights" may be any magnitude in which the weights of the characters are reflected and which increases according to the magnitudes of the weights. For example, the "magnitude based on the weights" may be a value obtained by multiplying the weight of each character by a coefficient for the character, and adding up the resultant weights. When the "information based on the weights" is not a numerical value but indicates any one of "large", "medium", and "small", the "magnitude based on the weights" may be represented as a "magnitude corresponding to one character whose weight is large" or a "magnitude corresponding to three characters whose weights are small", for example.

In the exemplary embodiment, the player character is set to the first type, and the capacity of the player character is set to be larger than the capacity of the first type NPC (e.g., the companion character or the third force character) (to be infinite in the exemplary embodiment). Thus, the player character becomes more likely to be set as a fight target for a larger number of enemy characters, compared to the other characters of the first type. For example, when many enemy characters participate in a fighting group, a situation in which the player character is targeted and attacked by many enemy characters is likely to occur. In the above case, if the number of enemy characters that target and attack the player character is small, there is the possibility that the player cannot have sufficient chances to perform game operations for the fight and therefore cannot sufficiently enjoy performing the game operations for the fight. Meanwhile, in the exemplary embodiment, chances for the player character to fight can be increased, thereby enhancing amusement of the game. In other embodiments, the capacity set for each character may be variable. For example, the game system 1 may dynamically change the capacity of each character such that, in a fighting group in which the player character participates, the player character has the largest capacity among the characters that participate in the fighting group. The capacity set for each character is optional. In other embodiments, there may be an NPC whose capacity is larger than the capacity of the player character.

The second condition is that, among characters of the same type, the total of weights set for another character for which each of the characters is set as a fight target, is as uniform as possible. In the exemplary embodiment, the first condition is preferential to the second condition, and the game system 1 sets the fight targets so as to satisfy the second condition on the assumption that the first condition is satisfied.

Specifically, in the exemplary embodiment, when setting a fight target for a certain character from among a plurality of characters of the other type, the game system 1 sets, as the fight target, a character whose capacity is not exceeded even when the weight of the certain character is added and in which the total of weights added thereto is the smallest. Therefore, for example, when setting a fight target for an enemy character, if a companion character that is not a fight target for an enemy character is present, the player character does not become a fight target for a plurality of enemy characters.

In the exemplary embodiment, as the second condition, the condition regarding the total of weights set for the other characters for which the certain character is a fight target, is used. In other embodiments, a condition regarding the number of other characters for which the certain character is a fight target, may be used as the second condition. For example, when the weight set for every character is 1, the second condition may be a condition regarding the number of the other characters for which the certain character is a fight target. That is, in other embodiments, the number of the other characters for which the certain character is a fight target may be treated as the total of weights described above.

As described above, in the exemplary embodiment, a first type character (e.g., the player character or the companion character) that is not a fight target in the fighting group is set as a fight target for a second type character (e.g., the enemy character), preferentially over a first type character that has become a fight target. This allows the fight targets to be set in a balanced manner. For example, it is possible to reduce the possibility of unnatural behaviors such that a certain companion character is not attacked at all because being not set as a fight target for an enemy character while another companion character is subjected to many attacks because being set as a fight target for many enemy characters. In other embodiments, a certain character out of a plurality of characters of the same type may be intensively set as a fight target.

Thus, in the example shown in FIG. 16, the fight targets are set such that the player character 201 becomes a fight target for three enemy characters 205 to 207, and the companion character 202 becomes a fight target for two enemy characters 203 and 204. Therefore, in the exemplary embodiment, the fight targets can be set in a balanced manner by using the first condition and the second condition, whereby the behaviors of the NPCs during the fight can be made natural.

In other embodiments, the specific method of setting fight targets is optional. For example, in other embodiments, for setting of fight targets, either or both of the first condition and the second condition may not be used, or another condition may be used. When both the first condition and the second condition are not used, the information about the capacity and the weight may not be set for each character.

In the exemplary embodiment, the game system 1 sets fight targets based on a predetermined priority rule, on the assumption that the first condition and the second condition are satisfied. A first priority rule is that, for the first type, the player character is preferentially set as a fight target. Therefore, for example, in a fighting group in which the player character, a companion character, and an enemy character participate, since the player character is preferential to the companion character, the player character becomes a fight target for the enemy character. Thus, chances for the player character to fight can be increased, thereby enhancing amusement of the game. In other embodiments, a priority order may be set according to the categories of characters, or a priority order may be set according to the kinds of characters (which means more detailed divisions than the categories).

The second priority rule is that another character nearer to a certain character is more preferentially set as a fight target. This reduces the possibility of an unnatural behavior such that an NPC moves toward a distant, hostile character even though there is a hostile character near the NPC.

In the exemplary embodiment, the first priority rule and the second priority rule are used as the priority rule, and the first priority rule is preferential to the second priority rule. However, in other embodiments, the specific content of the priority rule is optional, and another rule may be used. The second priority rule may be preferential to the first priority rule. Furthermore, in other embodiments, the game system 1 may set fight targets without using the priority rule.

Although not shown in FIG. 16, a fight target for the first type character (i.e., the player character 201 or the companion character 202) is set similarly to the fight target for the second type character. That is, the game system 1 sets the fight target for the first type character according to the first priority rule and the second priority rule so as to satisfy the first condition and the second condition. For example, in the situation shown in FIG. 16, the weights of the player character 201 and the companion character 202 are each 1, and the capacities of the enemy characters 203 to 207 are each 1. In this case, the enemy character 205 nearest to the player character 201 becomes a fight target for the player character 201, and the enemy character 204 nearest to the companion character 202 becomes a fight target for the companion character 202.

In the exemplary embodiment, the reason why a fight target is also set for the player character 201 is because the weight of the player character 201 is used for determination as to the first condition and the second condition when a fight target is set for each NPC of the first type. In other embodiments, the game system 1 may not set a fight target for the player character 201, and may perform determination as to the first condition and the second condition when setting a fight target for a first type character, without regard to the player character. Furthermore, in the exemplary embodiment, information about the fight target for the player character 201 is used only for determination as to the first condition and the second condition. However, in other embodiments, for example, the game system 1 may notify the player of an enemy character that is a fight target for the player character 201 (e.g., may display the enemy character being highlighted).

As described above, the game system 1 sets the fight targets for the characters that participate in the fighting group. However, in order to satisfy the first condition and the second condition, fight targets may not be set for some of the characters. For example, when the number of first type characters participating in the fighting group is great while the number of second type characters participating in the fighting group is small, if fight targets are set for all the first type characters, the first condition may not be satisfied in some cases. Then, the game system 1 may not set fight targets for some of the first type characters.

The algorithm of the specific process for setting fight targets is optional. For example, in the exemplary embodiment, the game system 1 calculates all combinations of the characters that participate in the fighting group and the characters that can be fight targets for the characters, and selects, from among the calculated combinations, combinations that satisfy the first condition and the second condition. At this time, the game system 1 rearranges all the calculated combinations in an order according to the priority rule described above, and selects, in this order, combinations that satisfy the first condition and the second condition, thereby selecting the combinations taking into account the priority rule.

2-5. Control of Motion of Character

Based on the fight target set for each NPC, the game system 1 causes each NPC to perform a motion regarding the fight. Examples of the motion regarding the fight include an attack motion to a character as an attack target, and a motion of moving toward the attack target.

In the exemplary embodiment, as described above, each NPC may not necessarily attack another character set as a fight target. That is, the game system 1 does not uniquely determine the character set as the fight target to be an actual attack target of the NPC, but determines a character to be an attack target taking into account the character set as the fight target. In the exemplary embodiment, the game system 1 determines an attack target of an NPC, based on a target determination rule described below.

A first target determination rule is a rule based on a fight target for an NPC, and the other characters being stored as characters recognized by the NPC. Specifically, the first target determination rule is as follows. That is, if the character being the fight target is stored as a character recognized by the NPC, this character is set as an attack target, whereas if the character being the fight target is not stored as a character recognized by the NPC, this character is not set as an attack target, and an attack target is determined from among other characters stored as the characters recognized by the NPC. Thus, it is possible to reduce the possibility of unnatural behaviors such that another character not recognized by the NPC (e.g., another character located distant from the NPC) becomes an attack target, and the NPC moves toward the distant character.

A second target determination rule is a rule based on a fight target for an NPC, and presence/absence of another character that has performed a specific attack on the NPC. Specifically, the second target determination rule is as follows. That is, when there is another character having performed a specific attack on the NPC, the another character is set as an attack target, whereas if another character having performed the specific attack on the NPC is not present, the character being the fight target is set as an attack target. The special attack is an attack more effective to the NPC than usual attacks. Examples of the specific attack include: a strong attack such as special move, an attack using a specific item (e.g., a bomb), and an attack on a weak point of the NPC. This makes the behavior of the NPC more natural.

As described above, in the exemplary embodiment, the game system 1 determines a target on which an NPC performs an attack motion, based on the fight target set for the NPC, and the target determination rule set for the NPC. Therefore, as described above, the fight target setting process and the attack target determination process can be separated from each other, whereby each NPC can be easily caused to take a behavior intended by the developer. In addition, since the actual attack target of the NPC can be changed according to the situation, the behavior of the NPC can be made more natural. In other embodiments, the attack target determination method is optional. For example, the fight target may be always determined as the attack target.

When the attack target of the NPC has been determined as described above, the game system 1 determines the content of a motion that the NPC should perform, and controls the NPC to perform the determined motion. For example, the NPC is controlled to perform a motion of attacking the character being the attack target, or a motion of moving toward the character being the attack target.

In the exemplary embodiment, when determining the content of motion of the NPC, the game system 1 does not refer to the position of the fight target. That is, the game system 1 determines the content of motion of the NPC without using the position of the fight target set for the NPC. In the exemplary embodiment, there is a case where a character that is not recognized by the NPC is set as a fight target for the NPC. In this case, if the position of the character being the fight target is used when the content of motion of the NPC is determined, the NPC may take an unnatural behavior such as moving toward the character that the NPC has not yet recognized. Therefore, in the exemplary embodiment, the content of motion of the NPC is determined without using the position of the fight target, thereby reducing the possibility that the NPC takes the unnatural behavior as described above. In the above case, the content of motion to be taken by the NPC is optional. For example, the game system 1 causes the NPC to move toward the character recognized by the NPC. This makes the behavior of the NPC natural. In other embodiments, the game system 1 may determine the content of motion of the NPC, based on the position of the fight target set for the NPC.

The algorithm (including the target determination rule described above) for determining the attack target of the NPC and the content of motion of the NPC may be set for each NPC or for each kind of NPC. Thus, for example, it is possible to cause a specific NPC to take a behavior such as continuously aiming at the fight target even when being attacked by another character, or a behavior such as attacking the fight target from a distance, i.e., without approaching the fight target. Thus, the behaviors of the respective NPCs can be characterized for each NPC or each kind of NPC.

3. Specific Example of Processing in Game System

Next, a specific example of information processing in the game system 1 will be described with reference to FIG. 17 to FIG. 20.

Figure 17:
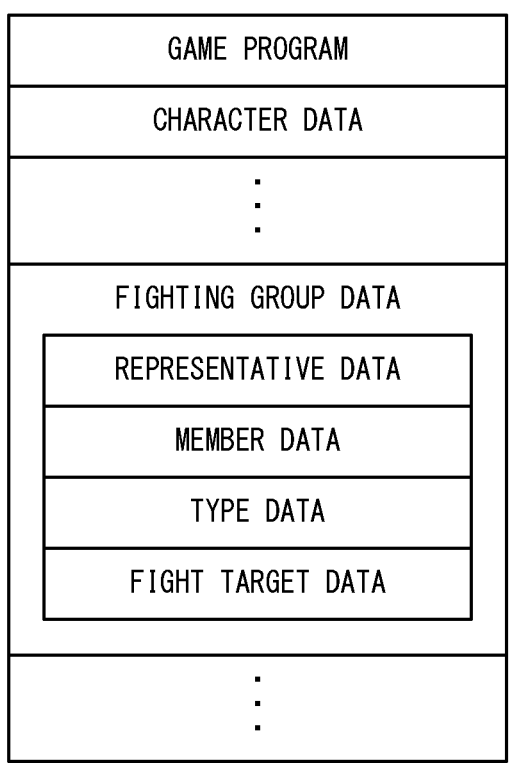
FIG. 17 shows an example of various data used in information processing in a non-limiting game system.

FIG. 17 shows an example of various data used for the information processing in the game system 1. The various data shown in FIG. 17 are stored in a storage medium (e.g., the flash memory 84, the DRAM 85, and/or the memory card attached to the slot 23) accessible by the main body apparatus 2.

As shown in FIG. 17, the game system 1 has a game program stored therein. The game program is a game program for executing game processing (specifically, processes shown in FIG. 18 to FIG. 20) in the exemplary embodiment. In the exemplary embodiment, data indicating the group setting conditions described above is included in the game program. The game system 1 has, stored therein, character data and fighting group data.

The character data is data regarding characters that appear in a game space (i.e., the player character and the NPCs). The game system 1 stores therein the character data for each character. The character data includes various kinds of information regarding the character (e.g., the position and the direction of the character in the game space, the state of the character, etc.). In the exemplary embodiment, the character data includes data indicating a character recognized by the character.

The fighting group data is data regarding a fighting group that is set during the game. The game system 1 stores therein the fighting group data for each fighting group that is set. In the exemplary embodiment, the fighting group data includes representative data, member data, type data, and fight target data. The representative data indicates a character that is a representative of the fighting group. The member data indicates characters, other than the representative, that participate in the fighting group. The type data indicates the type (i.e., the first type or the second type) set for each character that participates in the fighting group. The fight target data indicates a character that is a fight target for each character that participates in the fighting group.

Figure 18:
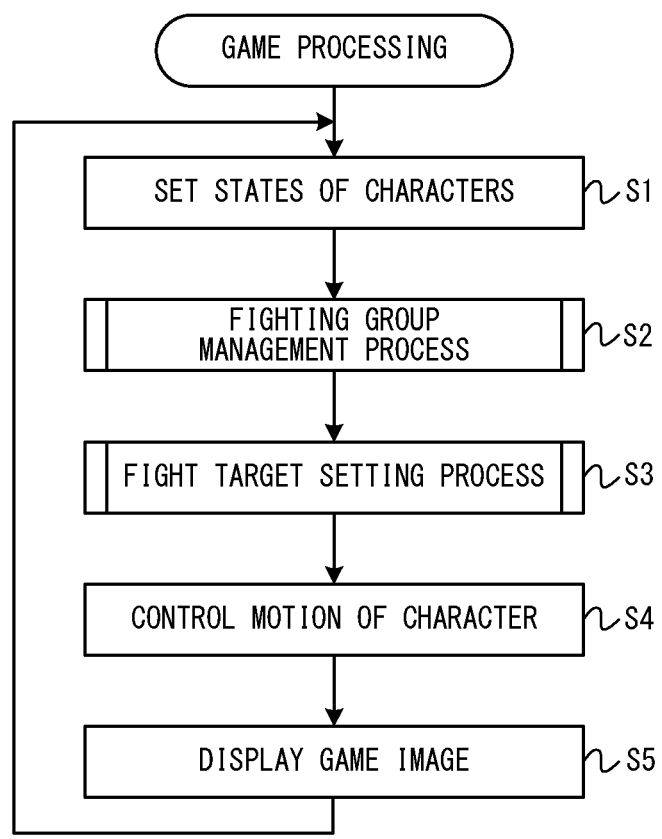
FIG. 18 is a flowchart showing an example of a flow of game processing executed in the non-limiting game system.

FIG. 18 is a flowchart showing an example of a flow of game processing executed by the game system 1. The game processing shown in FIG. 18 is started when an instruction to start the game has been made by the player during execution of the game program.

Figure 19:
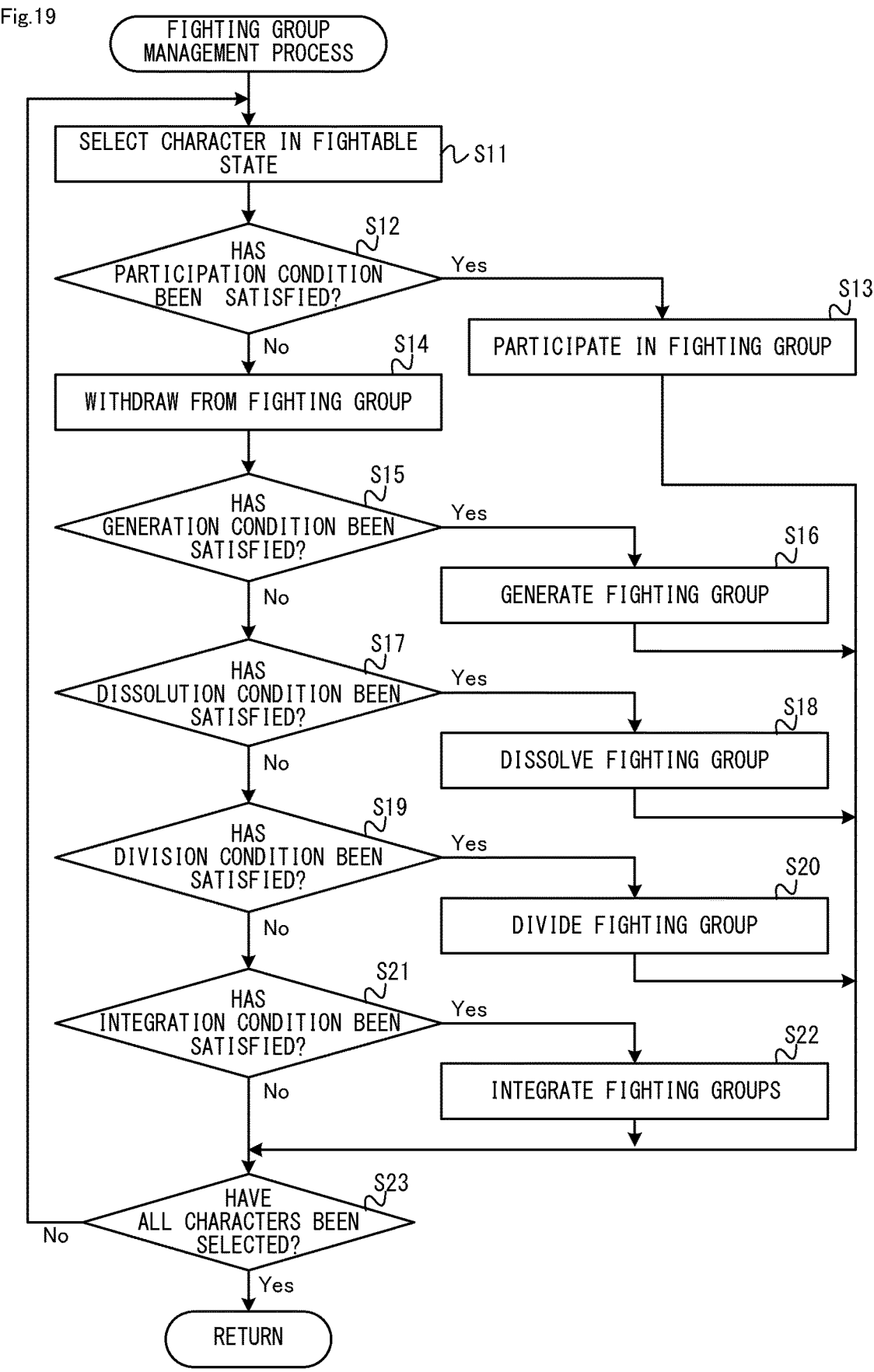
FIG. 19 is a sub flowchart showing an example of a specific flow of a fighting group management process in step S2 shown in FIG. 18.
Figure 20:
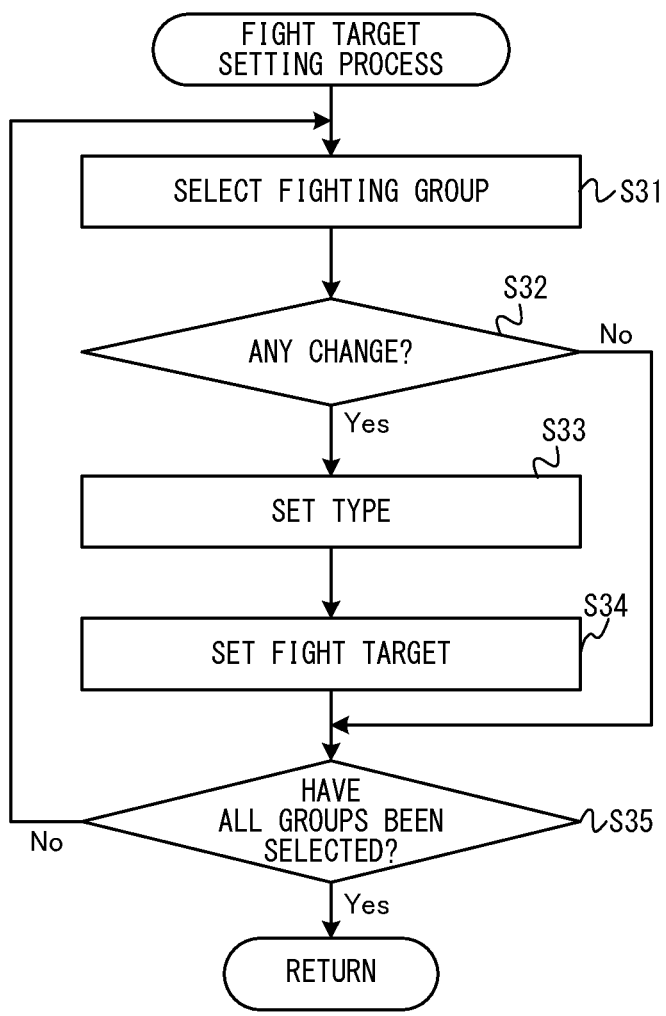
FIG. 20 is a sub flowchart showing an example of a specific flow of a fight target setting process in step S3 shown in FIG. 18.

In the exemplary embodiment, the processor 81 of the main body apparatus 2 executes the game program stored in the game system 1 to execute the processes in steps shown in FIG. 18 to FIG. 20. However, in other embodiments, a part of the processes in the steps may be executed by a processor (e.g., a dedicated circuit, etc.) other than the processor 81. Furthermore, if the game system 1 is communicable with another information processing apparatus (e.g., a server), a part of the processes in the steps shown in FIG. 18 to FIG. 20 may be executed by the another information processing apparatus. The processes in the steps shown in FIG. 18 to FIG. 20 are merely examples, and the processing order of the steps may be changed or another process may be executed in addition to (or instead of) the processes in the steps as long as similar results can be obtained.

The processor 81 executes the processes in the steps shown in FIG. 18 to FIG. 20 by using a memory (e.g., the DRAM 85). That is, the processor 81 stores information (in other words, data) obtained in each process step into the memory, and reads out the information from the memory when using the information for the subsequent process steps.

In step S1 shown in FIG. 18, the processor 81 sets a character that satisfies a condition into the fightable state, among the characters that appear in the game space. Specifically, the processor 81 sets the player character and the companion character always in the fightable states while these characters appear in the game space. Meanwhile, the processor 81 sets the enemy character and the third force character in the fightable states on the condition that these characters have found hostile characters. The processor 81 updates the character data, stored in the memory, of the character set in the fightable state so as to indicate that the corresponding character is in the fightable state.

In step S2, the processor 81 executes a fighting group management process for managing a fighting group. Hereinafter, a specific flow of the fighting group management process will be described with reference to FIG. 19.

FIG. 19 is a sub flowchart showing an example of the specific flow of the fighting group management process in step S2 shown in FIG. 18. In the fighting group management process, first, in step S11, the processor 81 selects one character in the fightable state from among the characters placed in the game space. At this time, the processor 81 selects a character that has not yet been selected in a process loop of steps S11 to S22 in the current fighting group management process. Next to step S11, the process in step S12 is executed.

In step S12, the processor 81 determines whether or not the participation condition is satisfied as to the character selected in step S11. That is, the processor 81 determines whether or not the character selected in step S11 satisfies the participation condition, with respect to each of one or more fighting groups being currently set (i.e., fighting groups represented by the fighting group data stored in the memory). If no participation condition is set for the category of the character selected in step S11 (i.e., if the character is the player character), the processor 81 determines that the participation condition is not satisfied. When the determination result in step S12 is positive, the process in step S13 is executed. When the determination result in step S12 is negative, the process in step S14 is executed.

In step S13, the processor 81 causes the character selected in step S11 to participate in the fighting group for which the participation condition is selected. Specifically, the processor 81 updates, according to need, the member data included in the fighting group data regarding the fighting group so that the member data includes the character. If the character has already participated in the fighting group, data of the character is included in the member data. Therefore, in this case, the processor 81 need not update the member data. Next to step S13, the process in step S23 described later is executed.

Meanwhile, in step S14, the processor 81 causes the character selected in step S11 to withdraw from the fighting group for which the participation condition is not satisfied. Specifically, the processor 81 updates, according to need, each member data included in each fighting group data stored in the memory so that the member data does not include the character. If the character does not participate in the fighting group, data of the character is not included in the member data. Therefore, in this case, the processor 81 need not update the member data. Next to step S14, the process in step S15 is executed.

In step S15, the processor 81 determines whether or not the generation condition is satisfied as to the character selected in step S11. If no generation condition is set for the category of the character selected in step S11 (i.e., if the character is the companion character), the processor 81 determines that the generation condition is not satisfied. When the determination result in step S15 is positive, the process in step S16 is executed. When the determination result in step S15 is negative, the process in step S17 is executed.

In step S16, the processor 81 generates a fighting group in which the character selected in step S11 is a representative. Specifically, the processor 81 newly generates fighting group data including representative data indicating the character, and stores the fighting group data in the memory. Next to step S15, the process in step S23 described later is executed.

In step S17, the processor 81 determines whether or not the dissolution condition is satisfied as to the character selected in step S11. If no dissolution condition is set for the category of the character selected in step S11 (i.e., if the character is assigned to a category other than the companion category), the processor 81 determines that the dissolution condition is not satisfied. When the determination result in step S17 is positive, the process in step S18 is executed. When the determination result in step S17 is negative, the process in step S19 is executed.

In step S18, the processor 81 dissolves the fighting group in which the character selected in step S11 is a representative. Specifically, the processor 81 deletes fighting group data including representative data indicating the character from the memory. Next to step S18, the process in step S23 is executed.

In step S19, the processor 81 determines whether or not the division condition is satisfied as for the character selected in step S11. If no division condition is set for the category of the character selected in step S11 (i.e., if the character is assigned to a category other than the companion category), the processor 81 determines that the division condition is not satisfied. When the determination result in step S19 is positive, the process in step S20 is executed. When the determination result in step S19 is negative, the process in step S21 is executed.

In step S20, the processor 81 divides the fighting group in which the character selected in step S11 is a representative. Specifically, the processor 81 newly generates fighting group data that includes representative data indicating the character, and includes member data indicating another character for which the character has been a fight target, and stores the fighting group data in the memory. Furthermore, the processor 81 updates the member data so as to delete the character participating in the newly generated fighting group, from the characters indicated by the member data included in the fighting group data indicating the fighting group from which the new fighting group is divided. Thus, from the fighting group in which the character satisfying the division condition has participated, the fighting group, in which the character is a representative and the another character for which the character has been a fight target participates, is divided. Next to step S20, the process in step S23 described later is executed.

In step S21, the processor 81 determines whether or not the integration condition is satisfied as to the character selected in step S11. If no integration condition is set for the category of the character selected in step S11 (i.e., if the character is the player character), the processor 81 determines that the integration condition is not satisfied. When the determination result in step S21 is positive, the process in step S22 is executed. When the determination result in step S21 is negative, the process in step S23 is executed.

In step S22, the processor 81 integrates the fighting group in which the character selected in step S11 is a representative, with another fighting group for which the integration condition is satisfied. Specifically, the processor 81 deletes the fighting group data including the representative data indicating the character from the memory, and updates the fighting group data indicating the another fighting group so that the fighting group data includes the member data of the characters having participated in the fighting group indicated by the deleted fighting group data. Thus, the characters having participated in the fighting group in which the character selected in step S11 is a representative are incorporated in the another fighting group for which the integration condition is satisfied, whereby the two fighting groups are integrated. Next to step S22, the process in step S23 is executed.

In step S23, the processor 81 determines whether or not all the characters placed in the game space have been selected in step S11. When the determination result in step S23 is negative, the process in step S11 is executed again. Thereafter, the process loop of steps S11 to S23 is repeatedly executed until all the characters are selected in step S11. When the determination result in step S23 is positive, the processor 81 ends the fighting group management process.

In step S3 after step S2, the processor 81 executes a fight target setting process for setting a fight target. Hereinafter, a specific flow of the fight target setting process will be described with reference to FIG. 20.

FIG. 20 is a sub flowchart showing an example of the specific flow of the fight target setting process in step S3 shown in FIG. 18. In the fight target setting process, first, in step S31, the processor 81 selects one fighting group from among the fighting groups that are currently set (i.e., the fighting groups indicated by the fighting group data stored in the memory). At this time, the processor 81 selects a fighting group that has not yet been selected in a process loop of steps S31 to S35 in the current fight target setting process. The processes in steps S32 to S34 described later are performed by using the fighting group data indicating the fighting group selected in step S31 (specifically, indicating the characters that participate in the fighting group). Next to step S31, the process in step S32 is executed.

In step S32, the processor 81 determines whether or not there is a change in the characters that participate in the fighting group selected in step S31. That is, in the fighting group management process in step S2, when a fighting group is newly generated (including the case of generation caused by division), when a new character participates in the fighting group (including the case of participation caused by integration), or when a character withdraws from the fighting group, the processor 81 determines that there is a change in the participating characters. When the determination result in step S32 is positive, the process in step S33 is executed. When the determination result in step S32 is negative, the process in step S35 described later is executed.

In step S33, the processor 81 sets a type to each of the characters participating in the fighting group selected in step S31. That is, the processor 81 sets the first type or the second type for each of the characters, according to the method described in the above "[2-4. Specific example of fight target setting method]". Specifically, the processor 81 updates the type data included in the fighting group data regarding the fighting group, stored in the memory, so that the type data indicates the set type. Next to step S33, the process in step S34 is executed.

In step S34, the processor 81 sets a fight target for each of the characters participating in the fighting group selected in step S31. That is, the processor 81 sets a character to be a fight target for each of the characters, according to the method described in the above "[2-4. Specific example of fight target setting method]". Specifically, the processor 81 updates the fight target data included in the fighting group data regarding the fighting group, stored in the memory, so that the fight target data indicates the set character. Next to step S34, the process in step S35 is executed.

In step S35, the processor 81 determines whether or not all the fighting groups being currently set have been selected in step S31. When the determination result in step S35 is negative, the process in step S31 is executed again. Thereafter, the process loop of steps S31 to S35 is repeatedly executed until all the fighting groups being currently set are selected in step S31. When the determination result in step S35 is positive, the processor 81 ends the fight target setting process.

In step S4 after step S3, the processor 81 controls the motions of the characters (i.e., the player character and the NPCs) in the game space. The processor 81 controls the motion of the player character, based on an operation input performed by the player. That is, the processor 81 acquires, at an appropriate timing, operation data received from the controllers via the controller communication section 83 and/or the terminals 17 and 21, and controls the motion of the player character, based on the acquired operation data. As for an NPC, if a fight target is set for the NPC, the processor 81 determines a motion of the NPC taking into account the fight target, according to the method described in the above "[2-5. Control of motion of character]". If no fight target is set for the NPC, the processor 81 determines a motion of the NPC according to the algorithm defined in the game program. As for the character whose motion has been controlled as described above, the processor 81 updates the character data stored in the memory so that the character data indicates the state of the character after the motion. When the process in step S1 is executed next, whether or not the character should be set in the fightable state is determined based on the character data updated in step S4. Next to step S4, the process in step S5 is executed.

In step S5, the processor 81 generates a game image representing the game space, and causes the display device to display the game image. For example, the processor 81 generates a game image representing the game space including the player character. During the game, the process loop of steps S1 to S5 is repeatedly executed once every predetermined time (e.g., 1 frame time), whereby the game image is updated so as to dynamically reflect the state of the game space. Next to step S5, the process in step S1 is executed again. Thereafter, a series of processes in steps S1 to S6 is repeatedly executed. The game processing shown in FIG. 18 is ended when the game is ended. During the game, the game processing may be interrupted under a predetermined situation (e.g., when a moving image for representation of the game is reproduced).

In the exemplary embodiment, the game program may be configured to include a fighting group management program and a motion determination program. The fighting group management program is a program for performing management of fighting groups and setting of fight targets. The processes in steps S2 and S3 are executed by the fighting group management program. The motion determination program is a program for determining the content of motion of each NPC. The process of determining the content of motion of each NPC in step S4 is executed by the motion determination program. In the above configuration, the fighting group management program sets a fight target for each NPC, and transfers information of the set fight target to the motion determination program. Based on the received information of the fight target, the motion determination program determines the content of motion of the NPC. Since the fighting group management program and the motion determination program are separated as described above, the algorithm for setting a fight target and the algorithm for determining the content of motion of an NPC are inhibited from being complicated, thereby facilitating creation of the game program.

4. Functions and Effects of Exemplary Embodiment, and Modifications

As described above, in the exemplary embodiment, an information processing system (specifically, the game system 1) is configured to include the following means (in other words, a game program as an example of an information processing program is configured to cause a computer to function as the following means).

Character control means that controls motions of a plurality of NPCs in a virtual space (step S4).

State setting means that, based on a predetermined condition, sets each of the plurality of NPCs in a fightable state for fighting against another NPC or a player character operated according to an operation input performed by a user (step S1).

Fighting group management means that sets a fighting group in which a plurality of characters including an NPC in the fightable state participate (step S2).

Target setting means that, for the NPC participating in the fighting group, sets a fight target that is another character (i.e., another NPC or the player character) participating in the fighting group (step S3).

The character control means controls a motion, regarding a fight, of an NPC, based on the fight target set for the NPC.

According to the above configuration, a fighting group in which a plurality of characters participate is set, and a fight target for each NPC is set in the fighting group. This reduces the possibility that each NPC takes an unintended behavior (e.g., attack targets of a plurality of NPCs are unintendedly concentrated on one character), thereby making the behaviors of the plurality of NPCs during the fight natural.

Furthermore, according to the above configuration, the information processing system performs a fight target setting process based on a fighting group and an NPC motion control process separately from each other. If it is attempted to set an algorithm that makes the behavior of each NPC natural in the NPC motion control process without performing the fight target setting process based on a fighting group, such an algorithm is complicated. This may result in an increase in the processing load of the information processing system, and an increase in the burden of development. Meanwhile, according to the above configuration, the algorithm in the NPC motion control process can be prevented from being complicated, thereby reducing the processing load of the information processing system and the burden of development.

The phrase "a fighting group in which a plurality of characters including an NPC in the fightable state participate" means that at least an NPC in the fightable state may participate in the fighting group, and does not mean to exclude a case where an NPC not in the fightable state participates in the fighting group. For example, the fighting group management means may set a fighting group including an NPC in the fightable state and an NPC not in the fightable state. When the NPC not in the fightable state participates in the fighting group, a fight target may not be set for the NPC, and the NPC may not be a fight target for another character.

In the embodiment described above, when a process is executed by using data (including a program) in an information processing apparatus (specifically, the main body apparatus), a part of the data required for the process may be transmitted from another information processing apparatus different from the information processing apparatus. In this case, the information processing apparatus may execute the process by using the data received from the another information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system may include a configuration for achieving the effect and execute a process for achieving the effect, and may not include other configurations and may not execute other processes.

The above embodiment can be used as, for example, a game system and a game program in order to, for example, cause a plurality of characters to take natural behaviors during a fight.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein a game program for causing a processor of an information processing apparatus to execute a game,
    the game program causing the processor to execute:
    controlling motions of a plurality of non-player characters in a virtual space;
    based on a predetermined condition, setting each of the plurality of non-player characters in a fightable state for fighting against another non-player character or a player character operated according to an operation input performed by a user;
    setting a fighting group in which a plurality of characters including a non-player character in the fightable state participate;
    setting, for the non-player character participating in the fighting group, a fight target that is another character participating in the fighting group; and
    controlling a motion, regarding a fight, of the non-player character based on the fight target set for the non-player character.

2. The storage medium according to claim 1, wherein
    the fighting group in which the non-player character in the fightable state participates is determined, for each non-player character, based on a group setting condition set for the non-player character.

3. The storage medium according to claim 2, wherein
    each of the plurality of non-player characters is assigned to any of a plurality of categories,
    the group setting condition is set for each of the categories, and
    the fighting group in which the non-player character in the fightable state participates is determined based on the group setting condition that is set for the category to which the non-player character is assigned.

4. The storage medium according to claim 2, wherein
    a character to be a representative of the fighting group is set from among the non-player character and the player character that are in the fightable states,
    the fighting group is set for each character to be the representative; and
    among the non-player character and the player character that are in the fightable states, a character that satisfies a participation condition as to the fighting group in which the representative is set, is added to the fighting group.

5. The storage medium according to claim 4, wherein
    dissolution of the fighting group or integration of the fighting group with another fighting group is performed based on the group setting condition that is set for the character to be the representative of the fighting group.

6. The storage medium according to claim 4, wherein
    the character to be the representative and the character that participates in the fighting group are set so that the player character does not participate in the fighting group as a character not being the representative.

7. The storage medium according to claim 4, wherein
    on a condition that a positional relationship between a character that participates in a first fighting group and is not a representative of the first fighting group and a character to be a representative of the first fighting group has become a positional relationship more distant than a predetermined criterion, a second fighting group in which the character that is not a representative of the first fighting group is a representative, is newly generated.

8. The storage medium according to claim 7, wherein
another character whose fight target in the first fighting group has been the character to be the representative of the second fighting group, is added to the second fighting group.

9. The storage medium according to claim 4, wherein
on a condition that the character to be the representative of the fighting group is not set as a fight target for any of other characters, the fighting group is dissolved, and
a fighting group in which the character to be the representative of the dissolved fighting group participates, is determined based on the group setting condition.

10. The storage medium according to claim 4, wherein
on a condition that a positional relationship between a character to be a representative of a certain fighting group and a character to be a representative of another fighting group has become a positional relationship closer than a predetermined criterion, the certain fighting group and the another fighting group are integrated into one fighting group.

11. The storage medium according to claim 1, wherein
when there is a change in the characters participating in the fighting group, the fight target is reset for each of the non-player characters participating in the fighting group.

12. The storage medium according to claim 11, wherein
when there is no change in the characters participating in the fighting group, the fight target is maintained for each of the non-player characters participating in the fighting group.

13. The storage medium according to claim 1, wherein
each of the characters participating in the fighting group is set to either a first type or a second type, and
a fight target for a non-player character of the first type is set from among characters of the second type, and a fight target for a non-player character of the second type is set from among characters of the first type.

14. The storage medium according to claim 13, wherein
each of the plurality of non-player characters and the player character is assigned to any of a plurality of categories,
the plurality of categories include a first category, a second category hostile to characters belonging to the first category, and a third category different from the first category and the second category,
in a case where a character of the first category and a character of the third category participate in the fighting group and a character in the second category does not participate in the fighting group, the character of the first category is set to the first type, and the character of the third category is set to the second type, and
in a case where a character of the first category, a character of the second category, and a character of the third category participate in the fighting group, the character of the first category and the character of the third category are set to the first type, and the character of the second category is set to the second type.

15. The storage medium according to claim 13, wherein
a character of the first type is provided with at least information indicating a capacity in a case where the character becomes a fight target for a character of the second type,
a character of the second type is provided with at least information indicating a weight of the character in a case where a character of the first type is set as a fight target for the character of the second type, and
in the fighting group, a fight target for the character of the second type is set so that a magnitude based on weights set for one or more characters of the second type, for which one character of the first type is set as a fight target, does not exceed a capacity set for the character of the first type being the fight target.

16. The storage medium according to claim 13, wherein
the player character and a non-player character being a companion of the player character are set to the first type.

17. The storage medium according to claim 16, wherein
in the fighting group, a character of the first type that is not a fight target is set as a fight target for a character of the second type, preferentially over a character of the first type that is a fight target.

18. The storage medium according to claim 17, wherein
a character of the first type is provided with at least information indicating a capacity in a case where the character becomes a fight target for a character of the second type,
a character of the second type is provided with at least information indicating a weight of the character in a case where a character of the first type is set as a fight target for the character of the second type,
in the fighting group, a fight target for the character of the second type is set so that a magnitude based on weights set for one of more characters of the second type, for which one character of the first type is set as a fight target, does not exceed a capacity set for the character of the first type being the fight target,
the player character is set to the first type, and
a capacity set for the player character is greater than a capacity set for a non-player character of the first type.

19. The storage medium according to claim 1, wherein
a target on which a non-player character performs an attack motion is determined based on a fight target set for the non-player character and a rule set for the non-player character.

20. An information processing system comprising one or more processors,
the one or more processors executing:
controlling motions of a plurality of non-player characters in a virtual space;
based on a predetermined condition, setting each of the plurality of non-player characters in a fightable state for fighting against another non-player character or a player character operated according to an operation input performed by a user;
setting a fighting group in which a plurality of characters including a non-player character in the fightable state participate;
setting, for the non-player character participating in the fighting group, a fight target that is another character participating in the fighting group; and
controlling a motion, regarding a fight, of the non-player character based on the fight target set for the non-player character.

21. A game processing method executed by an information processing system,
the information processing system executing:
controlling motions of a plurality of non-player characters in a virtual space;
based on a predetermined condition, setting each of the plurality of non-player characters in a fightable state for fighting against another non-player character or a player character operated according to an operation input performed by a user;

setting a fighting group in which a plurality of characters including a non-player character in the fightable state participate;
setting, for the non-player character participating in the fighting group, a fight target that is another character participating in the fighting group; and
controlling a motion, regarding a fight, of the non-player character based on the fight target set for the non-player character.

* * * * *